United States Patent
Basiji et al.

(10) Patent No.: US 10,656,057 B2
(45) Date of Patent: May 19, 2020

(54) BIOLOGICAL SAMPLE PROCESSING SYSTEMS AND METHODS

(71) Applicant: Biocare Medical, LLC, Pacheco, CA (US)

(72) Inventors: David Abraham Basiji, Seattle, WA (US); Eric Andrew Warner, Oceanside, CA (US); Saradha Avantsa, Concord, CA (US); Hoa Thuong Nguyen, San Ramon, CA (US); Smitha Sreedhar, San Jose, CA (US); Thomas Marion Maxwell, Danville, CA (US); Ziggy Q. Kotchetkov, Oakland, CA (US); Kathlyn Leigh Rettig, Walnut Creek, CA (US); Deidra Imani Jackson, Antioch, CA (US); Ravishankar Melkote, Fremont, CA (US); Zhiweng Chang, San Leandro, CA (US); Maria Lourdes Teixeira, Pleasanton, CA (US)

(73) Assignee: Biocare Medical, LLC, Pacheco, CA (US)

(*) Notice: Subject to any disclaimer, the term of this patent is extended or adjusted under 35 U.S.C. 154(b) by 271 days.

(21) Appl. No.: 15/582,206

(22) Filed: Apr. 28, 2017

(65) Prior Publication Data
US 2017/0315032 A1   Nov. 2, 2017

Related U.S. Application Data

(60) Provisional application No. 62/449,742, filed on Jan. 24, 2017, provisional application No. 62/329,961, filed on Apr. 29, 2016.

(51) Int. Cl.
*G01N 1/31* (2006.01)
*G01N 1/30* (2006.01)
(Continued)

(52) U.S. Cl.
CPC .............. *G01N 1/312* (2013.01); *G01N 1/30* (2013.01); *G01N 1/36* (2013.01); *G01N 35/1002* (2013.01);
(Continued)

(58) Field of Classification Search
CPC ............ G01N 1/312; G01N 1/30; G01N 1/36; G01N 35/1002; G01N 2001/317;
(Continued)

(56) References Cited

U.S. PATENT DOCUMENTS 5,346,672 A * 9/1994 Stapleton .............. B01L 3/5027
422/559
2006/0275861 A1  12/2006 Angros et al.
(Continued)

FOREIGN PATENT DOCUMENTS

AU    2004205218    9/2004
WO    WO0038838     7/2000
(Continued)

OTHER PUBLICATIONS

The PCT Search Report and Written Opinion dated Oct. 16, 2017 for PCT application No. PCT/US2017/030243, 14 pages.
(Continued)

*Primary Examiner* — Benjamin R Whatley
(74) *Attorney, Agent, or Firm* — Lee & Hayes, P.C.

(57) ABSTRACT

This disclosure provides a biological sample processing system and methods for processing biological samples. The processing may include one or both of removing wax from wax-embedded biological samples and applying a reagent to biological samples. Aspects of the dewaxing technique and the technique for applying the reagent may be combined to achieve energy efficiencies. Additional efficiency may be achieved by recirculating heated reagent. A hybrid power system may use a source of stored power to supplement (Continued)

external power at times of peak demand. Uniform distribution of liquids across a surface of the biological samples may be achieved by self-leveling using an inclinometer.

15 Claims, 11 Drawing Sheets

(51) Int. Cl.
*G01N 1/44* (2006.01)
*G01N 35/10* (2006.01)
*G01N 1/36* (2006.01)
*G01N 35/00* (2006.01)

(52) U.S. Cl.
CPC . *G01N 2001/317* (2013.01); *G01N 2001/364* (2013.01); *G01N 2035/00138* (2013.01); *G01N 2035/00425* (2013.01)

(58) Field of Classification Search
CPC ... G01N 2001/364; G01N 2035/00138; G01N 2035/00425
See application file for complete search history.

(56) References Cited

U.S. PATENT DOCUMENTS

| | | | |
|---|---|---|---|
| 2008/0038836 A1* | 2/2008 | Reinhardt | B01L 9/52 436/174 |
| 2013/0137136 A1 | 5/2013 | Cobb et al. | |
| 2015/0202627 A1* | 7/2015 | Li | B01L 9/52 422/536 |

FOREIGN PATENT DOCUMENTS

| | | |
|---|---|---|
| WO | WO0242737 | 5/2002 |
| WO | WO03089140 | 10/2003 |
| WO | WO2004057307 | 7/2004 |

OTHER PUBLICATIONS

The PCT Written Opinion of the International Preliminary Examining Authority for PCT application No. PCT/US2017/030243, 4 pages.
Biocare Medical, Intellipath, retreived from http://biocare.net/products/instrumentation/intellipath/ on Apr. 27, 2017, 5 pages.
Magnum Energy, MagnaSine Hybrid—Mobile Series, Pure Sine Wave Inverter/Charger Owner's Manual, 2013, 64 pages.
PerkinElmer, Opal Multiplex IHC Assay Development Guide, published 2014, 5 pages.

* cited by examiner

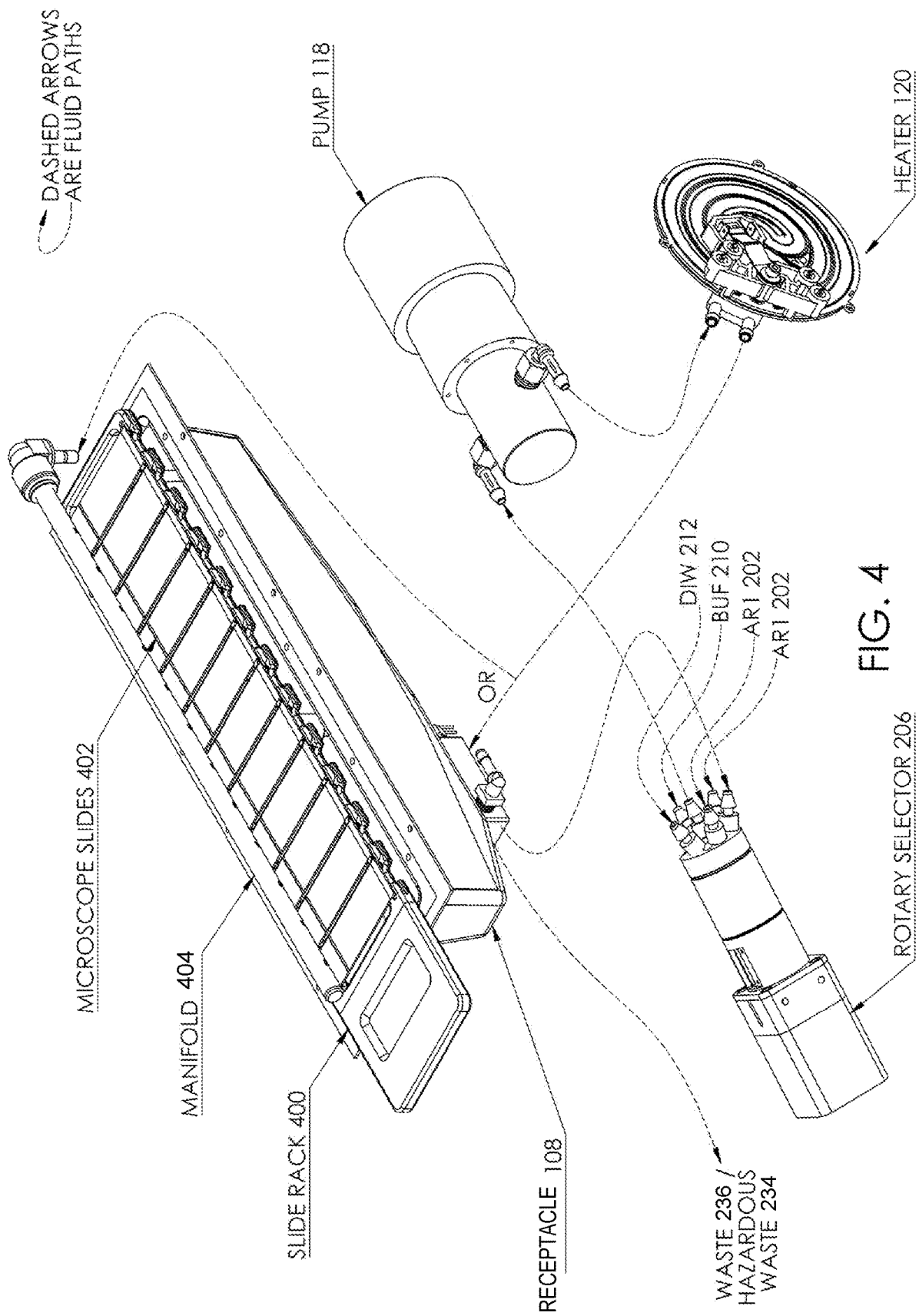

BIOLOGICAL SAMPLE PROCESSING SYSTEMS AND METHODS

RELATED APPLICATION

This application claims priority to U.S. Provisional Patent Application No. 62/329,961 filed on Apr. 29, 2016 and entitled "Novel Tissue Pre-processing Method and Apparatus," and priority to U.S. Provisional Patent Application No. 62/449,742, filed on Jan. 24, 2017 and entitled "Hybrid Electric Power Supply," the entire contents of both referenced applications are incorporated herein by reference.

TECHNICAL FIELD

The disclosure generally relates to automated systems and methods for use in processing of biological samples.

BACKGROUND

Tissue sections are a type of biological sample that may be studied using histochemical techniques. Histochemical analysis of tissue samples often involves immunohistochemical staining to visualize features of the tissue for examination under a microscope.

Creating tissue sections may involve freezing the tissue or preserving the tissue with a fixative and supporting the tissue structure by infiltrating the tissue with paraffin wax. Paraffin has been used for many years as an embedding medium in the preparation of tissue specimens for sectioning in a microtome to produce specimen sections for histological studies. Such embedding processes generally include specimen fixation, dehydration, clearing, paraffin infiltration or impregnation, blocking or embedding in a block of paraffin, slicing the block and specimen into thin sections, mounting the sections on microscope slides, removing the paraffin ("dewaxing" or "deparaffinizing"), partially reversing specimen fixation ("antigen retrieval"), and staining the sections prior to microscopic analysis. The primary purpose of freezing or of the embedding medium is to permit the specimens to be sectioned and mounted in a natural state. A common fixative is a formaldehyde-based solution such as formalin that cross-links proteins in the tissue specimen by forming methylene bridges which increase structural stability and help the specimen retain its natural structure. Sectioned tissues preserved in this way are referred to as formalin fixed paraffin embedded (FFPE) tissue sections.

Dewaxing of tissue sections is typically performed at room temperature using a volatile solvent like xylene or less teratogenic substitutes that dissolve the wax directly. Alternatively, dewaxing can be accomplished using an aqueous detergent solution by heating the slide above the melting point of the wax (the melting point varies based on composition of the wax and other factors but is between about 30 and 100° C.), which allows the detergent solution to emulsify the wax over several minutes. Dewaxing allows further treatment of the tissue section using aqueous reagents.

The stains used to color the tissue often include antibodies selected to bind to specific portions of the tissue. However, the fixation process may mask antigenic sites. Fixation can alter protein biochemistry such that the epitope of interest is masked and can no longer bind to the primary antibody. Masking of the epitope can be caused by cross-linking of amino acids within the epitope, cross-linking unrelated peptides at or near an epitope, altering the conformation of an epitope, or altering the electrostatic charge of the antigen. "Antigen retrieval" (AR) refers to any technique in which the masking of an epitope is reversed and epitope-antibody binding is restored. AR at least partially reverses some of the effects of fixation and exposes antigenic sites, allowing antibodies and thus, the stain to bind. The need for AR depends on multiple variables, including but not limited to, the target antigen, the antibody used, the type of tissue, and the method and duration of fixation.

Heat may be employed in AR, where one technique is to immerse the tissue section in a basic or acidic AR solution held between 95-115° C. for a period of 30-45 minutes. The choice of basic or acidic AR solution depends on which solution yields better reactivity with the staining antibody to be used subsequently. Immunohistochemical stains are applied to the tissue sample after AR.

Conventional automated systems for tissue staining on microscope slides heat the dewaxing and AR solutions using electric heating elements mounted under each slide. However, a glass microscope slide is a poor conductor of heat, requiring the use of relatively powerful (30-40 W) heaters under the microscope slides. The power demands of the heaters limit the capacity of automated systems. Further, the location of the heaters under the slides subjects the heaters to frequent direct exposure to moisture and caustic solutions during the tissue specimen preprocessing and staining processes, leading to heater failure. Because relatively low volumes (~1 ml) of the dewax and AR solutions are typically dispensed on each slide, these liquids are subject to rapid evaporation, resulting in use of slide covers to reduce evaporation. Slide covers add process complexity and material waste.

SUMMARY

This Summary is provided to introduce a selection of concepts in a simplified form that are further described below in the Detailed Description. This Summary is not intended to identify key features or essential features of the claimed subject matter nor is it intended to be used to limit the scope of the claimed subject matter.

The biological sample processing system described herein may be adapted for use in a variety of applications including but not limited to preparing tissue samples for staining (both wax-embedded and frozen), preparing cytological smears (e.g., cell or blood) for staining, preparing tissue microarrays, preparing DNA samples affixed to a two-dimensional surface, and the like. The biological sample processing system may include any combination of the following features: dewaxing, continuous reagent application, use of a stored power supply to meet peak power demands, and self-leveling. The biological sample may be loaded into the biological sample processing system by any suitable technique which will vary based on the type of biological sample and design of the system. In some implementations, the biological sample may be placed on a microscope slide. The microscope slide may be loaded singly or placed in a slide rack with one or more other microscope slides. The microscope slide or the slide rack may be placed into a holder in the biological sample processing system.

In implementations in which the biological sample contains wax, the biological sample processing system may dewax biological samples by applying light mineral oil.

In implementations in which a reagent is applied to the biological sample, the biological sample processing system may apply the reagent continuously or periodically in response to a triggering event through use of a recirculating system. In some implementations the reagent may be heated.

In some implementations the biological sample processing system may, for a portion of its operation cycle, draw more power than is provided by an external power source. Periodic demand for high levels of power may be due to use of energy-intensive components such as, for example, a heater. The biological sample processing system may include a power storage device that supplements the external power source during times of greatest demand. The power storage device may be recharged by the external power source during times when the biological sample processing system has lower power demands.

In an implementation, the biological sample processing system may be maintained in a perpendicular orientation relative to gravity (e.g., "level") by an adjustable support responsive to an inclinometer. Maintaining all or part of the system level may assist in providing even distribution of the light mineral oil and or the reagent. The orientation of the biological sample processing system may be adjusted specifically to maintain the holder in a level orientation.

DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 4 shows additional details of selected components of an example biological sample processing system.

DETAILED DESCRIPTION

The biological sample processing system described herein incorporates multiple improvements over conventional systems. The use of light mineral oil to dewax tissue sections replaces carcinogenic and/or volatile solvents with a stable hydrocarbon. The ability of light mineral oil to dissolve wax at room temperature eliminates the need for elevated temperatures during dewaxing. Continuous application of a reagent allows for operation without the use of slide covers because there is no longer a need to cover the reagent in order to prevent evaporation. In implementations in which the reagent is heated, placing the heater in a location other than under the biological sample protects the heater and can improve reliability. There are more options for heater configurations when the heater is not located beneath the biological samples. Heating the reagent directly rather than heating the slides makes it possible to provide more uniform heating to the reagent. Recirculating heated reagent also reduces energy consumption because the recirculated reagent retains some of the heat from the previous cycle. Flowing the reagent continuously over a biological sample can also shorten processing times by creating more favorable reaction kinetics. Use of a hybrid power system including a stored power source takes advantage of a high peak-to-average power demand ratio to increase system throughput. By making more power available at times of peak need, it is possible to process a larger number of biological samples at one time. A hybrid power system can also relax the constraints on both the peak power and the total amount of power the biological sample processing system can draw during its operation. Maintaining the level of the biological sample processing system can increase the uniformity of staining because the light mineral oil for dewaxing and/or the reagent are distributed evenly across the biological sample. Thus, the entire surface of the biological sample is treated consistently during preprocessing which results in more uniform response to staining.

Figure 1:
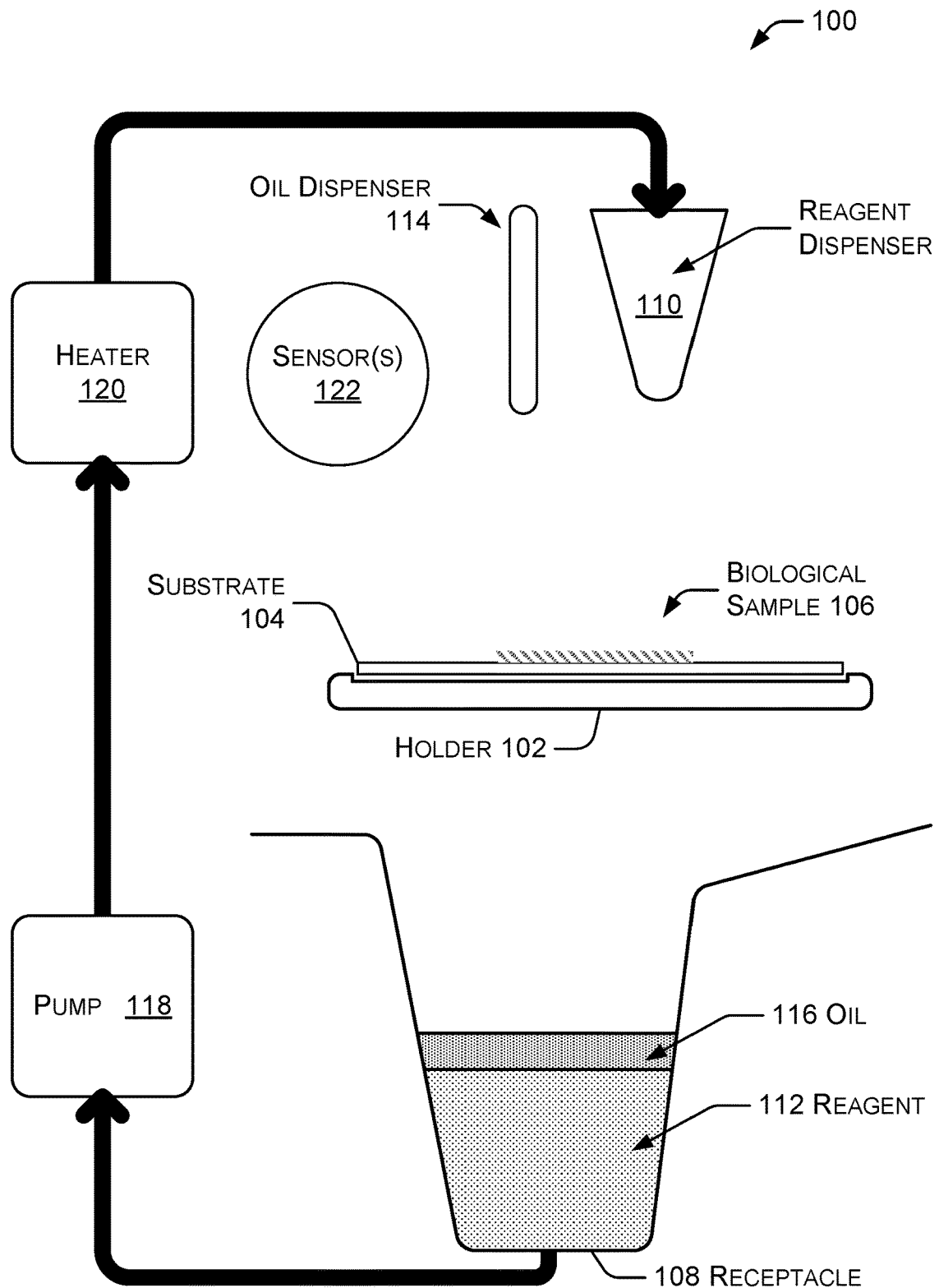
FIG. 1 shows a schematic view of an example biological sample processing system.

FIG. 1 illustrates one implementation the biological sample processing system 100. This system may be described as a system for preprocessing slides of tissue sections prior to staining. However, the biological sample processing system 100 is not limited to this usage. Alternative implementations may include sample processing systems for cytological smears (e.g., cell or blood), tissue microarrays, DNA samples affixed to a two-dimensional surface, and the like.

A holder 102 supports a substrate 104 onto which a biological sample 106 may be placed. The holder 102 may be implemented as any type of frame, receptacle, etc. that receives a substrate 104 and securely holds the substrate 102 in the biological sample processing system 100. The substrate 104 is generally removable from the biological sample processing system 100 and capable of containing or otherwise supporting the biological sample 106. In one implementation, the substrate 104 may be a microscope slide. In certain designs of the biological sample processing system 100, the substrate 104 may be omitted and the biological sample 106 may be placed directly into a holder 102. The biological sample 106 may be any type of biological sample 106 such as a tissue sample, a blood sample, a cell sample, a molecular sample, etc. In one implementation, the biological sample 106 is a tissue section such as a frozen tissue section or a preserved tissue section.

A receptacle 108 located below the holder 102 is configured to collect liquids applied to the biological sample 106 after those liquids have run off of the substrate 104 and the holder 102. Thus, liquid volumes applied in excess to the biological sample 106 can be collected in the receptacle 108 and disposed of or reused. Additionally, liquids applied to the biological sample 106 that are washed off by application of a subsequent liquid such as, for example, warm distilled water, may also be collected in the receptacle 108.

A reagent dispenser 110 located above the holder 102, and thus above the biological sample 106 when inserted into the holder 102, can dispense a reagent 112 onto the biological sample 106. Reagent 112 that flows off of the holder 102 is collected in the receptacle 108 as shown. An oil dispenser 114 may also be located above the holder 102 for dispensing oil 116 onto the biological sample 106. The oil 116 may be drawn from an oil reservoir (not shown). The reagent 112 may be caught by the receptacle 108 mounted under the holder 102. The oil 116 also collects in the receptacle 108. Rather than draining the receptacle 108 to dispose of the oil 116 which has also flowed off of the substrate 104 into the receptacle 108, the oil 116 is allowed to float on top of the heated reagent 112, thereby insulating the reagent 112 in the receptacle 108 to maintain its temperature and reduce the amount of power necessary to reheat the reagent 112 for subsequent application to the biological samples 106. In implementations in which the reagent 112 is an aqueous solution, the oil 116 will float on top of the reagent 112. This layer of oil 116 on top of the reagent 112 and the receptacle 108 may serve to prevent loss of heat from the reagent 112 into the air above the receptacle 108 via radiation, conduction, and other mechanisms. This serves to maintain the reagent 112 at an elevated temperature for implementations in which heated reagent 112 is used. In order to further prevent cooling of heated reagent 112, the receptacle 108 may also be insulated or heated.

In one implementation, reagent 112 collected in the receptacle 108 may be recirculated to the reagent dispenser 110. This recirculation may allow for continual reagent 112 dispensing onto the biological sample 106. Movement of the reagent 112 through this path may be powered by one or more pumps 118. The pump 118, or a different pump, may also move reagent 112 from a reservoir (not shown) into the recirculating system. In implementations in which heated reagent 112 is used, the heater 120 may be included in the recirculating system. If the biological sample processing system 100 includes a heater 120, yet for particular application the reagent 112 is not to be heated, the reagent 112 may be passed through the heater 120 without turning the heater on or may be directed through an alternative path that does not include the heater 120.

The biological sample processing system 100 may also include on or more sensors 122. The sensors 122 may be configured to measure ambient conditions such as temperature and humidity. The sensors 122 may also be configured to measure liquid level in the receptacle 108, a reservoir for the reagent 112, a reservoir for the oil, or in a bulk storage container, etc. Other sensors 122 may monitor conditions of the reagent 112. A pH meter may measure pH of the reagent 112. An optical sensor may monitor a change in color or optical density of the reagent 112. A thermometer may measure temperature of the reagent 112.

The biological sample processing system 100 may include many additional components and systems in addition to those illustrated in FIG. 1. For example, the biological sample processing system 100 may include an instrument structural frame which contains and/or supports the various components. Some of the additional components are discussed below. Many of the components introduced in FIG. 1 are described in greater detail below. By way of example only, the biological sample processing system may include any of the components present in an automated slide staining system such as the ONCORE™ Automated Slide Staining System by Biocare Medical of Pacheco, Calif.

Figure 2:
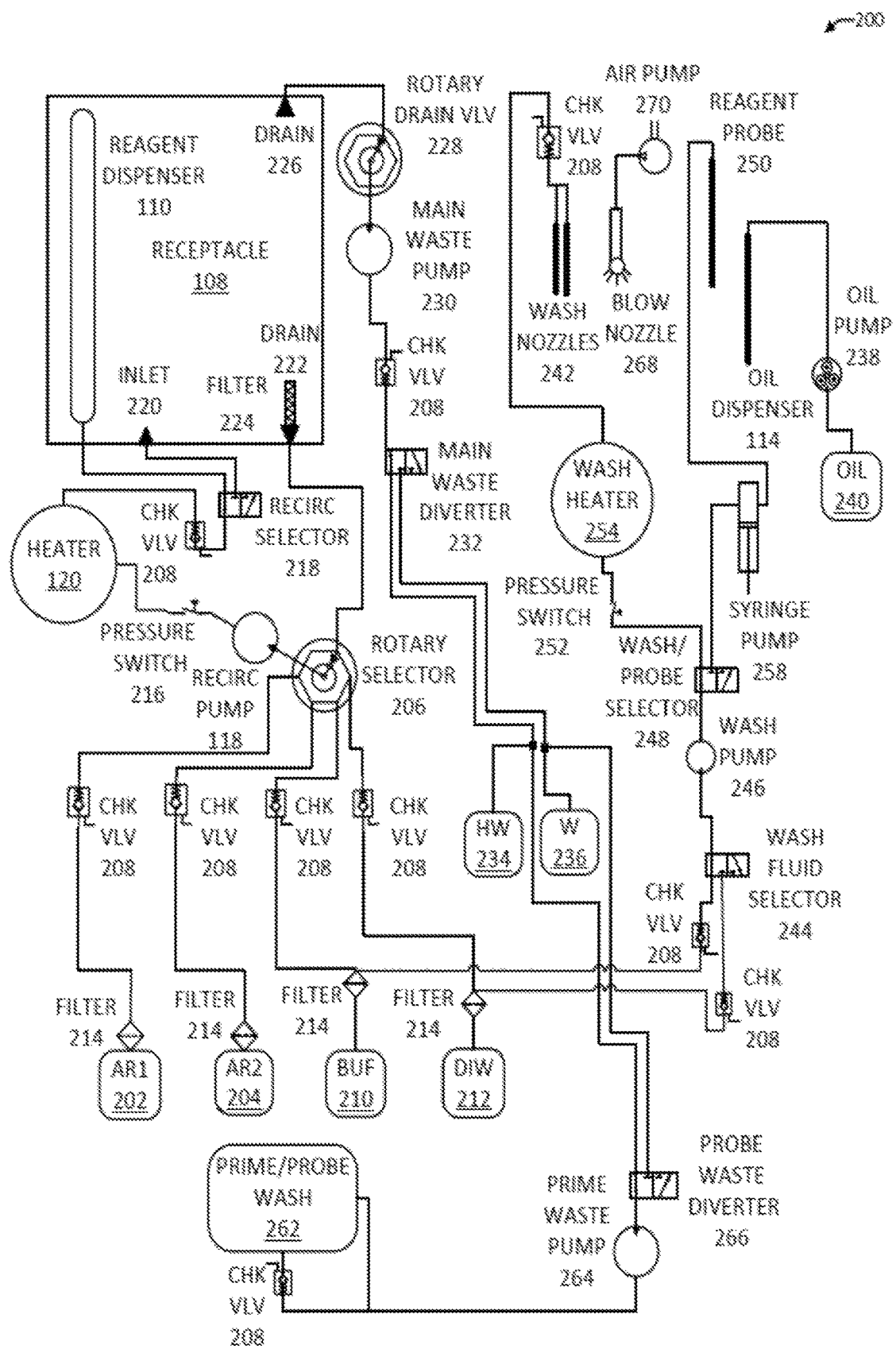
FIG. 2 shows a fluidics diagram of an example biological sample processing system.

FIG. 2 is a fluidics diagram 200 showing additional details of the biological sample processing system 100. This illustrative fluidics diagram 200 shows a specific use case for automated slide staining. However, persons of ordinary skill in the art will understand how the components described herein may be adapted for other applications.

In one implementation, the reagent 112 may be an antigen retrieval (AR) solution. The AR solution may include a low (e.g., ~0.1%) concentration of a foaming agent such as a surfactant or detergent. The foaming agent may be one or more detergents (e.g., SDS, Tween-20, cocoamide DEA, Brij 35, etc.). The foaming agent may serve any of several functions depending on the particular foaming agent:

1. it may emulsify the residual oil 116 used in dewaxing the biological sample 106, thereby eliminating the need for a separate washing step between dewaxing and antigen retrieval,
2. it may act as a wetting agent to facilitate AR solution spreading over the entire surface of the biological sample 106,
3. it may encourage the generation of foam as the AR solution is pumped and dispensed, thereby forming a thermal insulating layer over the substrate 104 supporting the biological sample 106 that reduces heat loss and increases temperature uniformity,
4. it may increase the effectiveness of the AR solution by acting as a protein denaturant,
5. it may extend the shelf life of the AR solution due to the antiseptic properties of certain detergents (e.g. cocoamide DEA), and/or
6. it may keep the biological sample processing system 100 cleaner, thereby reducing maintenance requirements.

The biological sample processing system 100 may be configured to dispense one or more different types of AR solution. Two types are shown here as AR1 102 and AR2 104 (e.g. high pH & low pH AR solution). A rotary selector 106 is used to select among the available reagents, AR1 202 and AR2 204, and other fluids that may be applied to the biological sample 106. The reagents 112 and other liquids may be stored in reservoirs or carboys that are included in the biological sample processing system 100 or may be placed nearby the main instrument and connected by tubing. Check valves 208 may be used to prevent backflow of the reagents and other fluids into their respective reservoirs. A buffer 210 and distilled water 212 may be some of the other fluids that are connected to the rotary selector 206, which is used to select the fluid provided to the pump 118. Each of the fluid sources, AR1 202, AR2 204, buffer 210, distilled water 212, etc. may pass through a filter 214 to prevent impurities and contaminants from entering the plumbing of the biological sample processing system 100.

The rotary selector 206 may be connected to the pump 118 which may be implemented as a recirculating pump. A pressure switch 216 between the pump 118 and the heater 120 may ensure that the pump 118 is effectively driving fluid through the heater 120 before it is turned on, thereby preventing damage to the heater 120. Fluid leaving the heater 120 may be directed by a recirculation selector 218 through an inlet 220 into the receptacle 108 or into the reagent dispenser 110. The reagent dispenser 110 dispenses a reagent across multiple different biological samples simultaneously. The recirculation selector 218 may be operated to send fluid such as AR1 202 or AR2 204 into the receptacle 108 directly, rather than through the reagent dispenser 110, in order to fill the receptacle 108 with a working volume of reagent that may be recirculated.

The receptacle 108 may include a first drain 222 that returns fluid in the receptacle 108 to the rotary selector 206. This enables recirculation of AR1 202, AR2 204, or any other liquid. A filter 224 may be placed over the opening of the first drain 222 to prevent contaminants that may have collected in the receptacle 108 from returning to the internal systems of the biological sample processing system 100. The receptacle 108 may also include a second drain 226 for waste disposal. Liquid from the receptacle 108 emptied through the second drain 226 is not returned for recirculation. Liquid emptied from the receptacle 108 through the second drain 226 may pass through a rotary drain valve 228 and is pulled through the waste disposal channel by a main waste pump 230. A check valve 208 prevents backflow of waste. A main waste diverter 232 allows hazardous waste 234 and nonhazardous waste 236 to be directed to different storage containers.

In some implementations, the biological sample processing system 100 may include movable or "robotic" components that can change position relative to the holder 102. The following components from FIG. 2 may be included on such a robotic component or other feature and may be able to move relative to one or more biological samples 106 placed in the holder 102.

The robotic component or other portion of the biological sample processing system 100 may include an oil dispenser 114 that dispenses the oil 116 onto the biological sample 106. An oil pump 238, which may be implemented as a peristaltic pump, can move the oil 116 from an oil reservoir 240 to the oil dispenser 114. One or more wash nozzles 242 may be configured to wash the biological sample 106 and/or the holder 102 with the buffer 210, distilled water 212, or possibly another solution. The washing may serve to clean the holder 102 and receptacle 108 or may be part of processing the biological sample 106. A wash fluid selector 244 controls which of the buffer 210 or the distilled water 212 is provided to the wash nozzles 242. A wash pump 246 moves the selected fluid to the wash nozzles 242. A wash/probe selector 248 directs the fluid to either the wash nozzles 242 for washing or to a reagent probe 250. A pressure switch 252 ensures that fluid is flowing through a wash heater 254 before it is turned on, thereby preventing damage to the wash heater 254. The wash heater 254 heats the buffer 210 or the distilled water 212 before application via their wash nozzles 242. A check valve 208 prior to the wash nozzles 242 prevents backflow. The reagent probe 250 may also dispense the buffer 210 or the distilled water 212. A syringe pump 258 may be used to control dispensing of liquids from the reagent probe 250. A prime/probe wash 258 is positioned so that the reagent probe 250 can be inserted within the prime/probe wash 260 in order to wash the reagent probe 250. A prime waste pump 264 pumps waste from the prime/probe wash 262 through a probe waste diverter 266 and separates hazardous waste 234 from nonhazardous waste 236. A blow nozzle 268 connected to an air pump 270 may also be included in the movable robotic component to blow air onto the substrate 104 in order to remove excess liquid before the application of a subsequent reagent via reagent probe 250.

FIGS. 3A-3D are fluidics diagrams showing alternative implementations of the recirculating reagent system shown in FIG. 1 and FIG. 2. All FIGS. 3A-3D include a rotary selector 206, a pump 118, a heater 120, a receptacle 108, and a reagent dispenser 110 as described above.

Figure 3A:
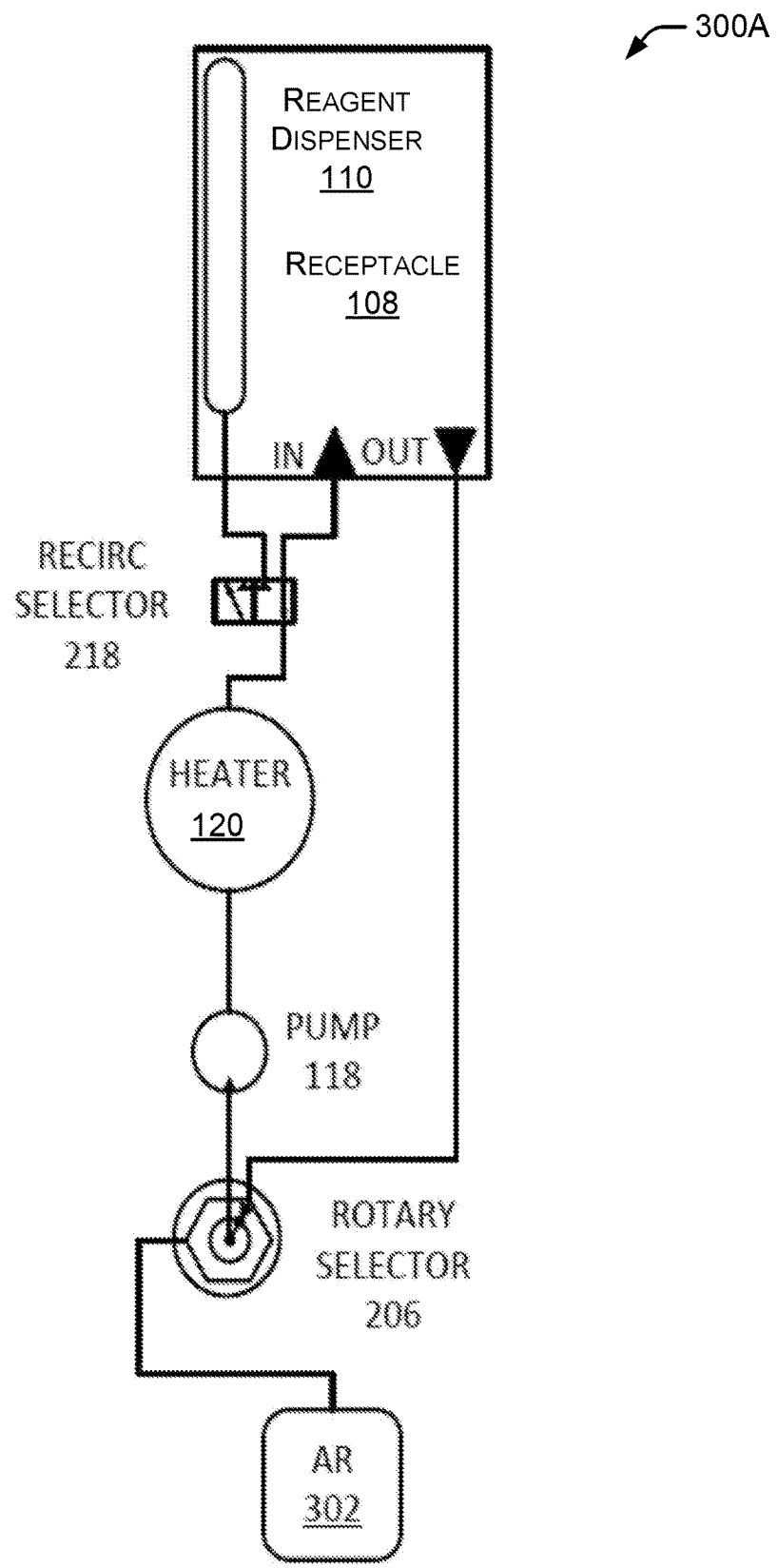
FIGS. 3A-3D show fluidics diagrams of illustrative implementations of an example biological sample processing system for continuous dispensing of a reagent onto a biological sample.

FIG. 3A shows a relatively simple fluidics diagram 300A in which one AR solution 302 is provided to a reagent dispenser 110.

Figure 3B:
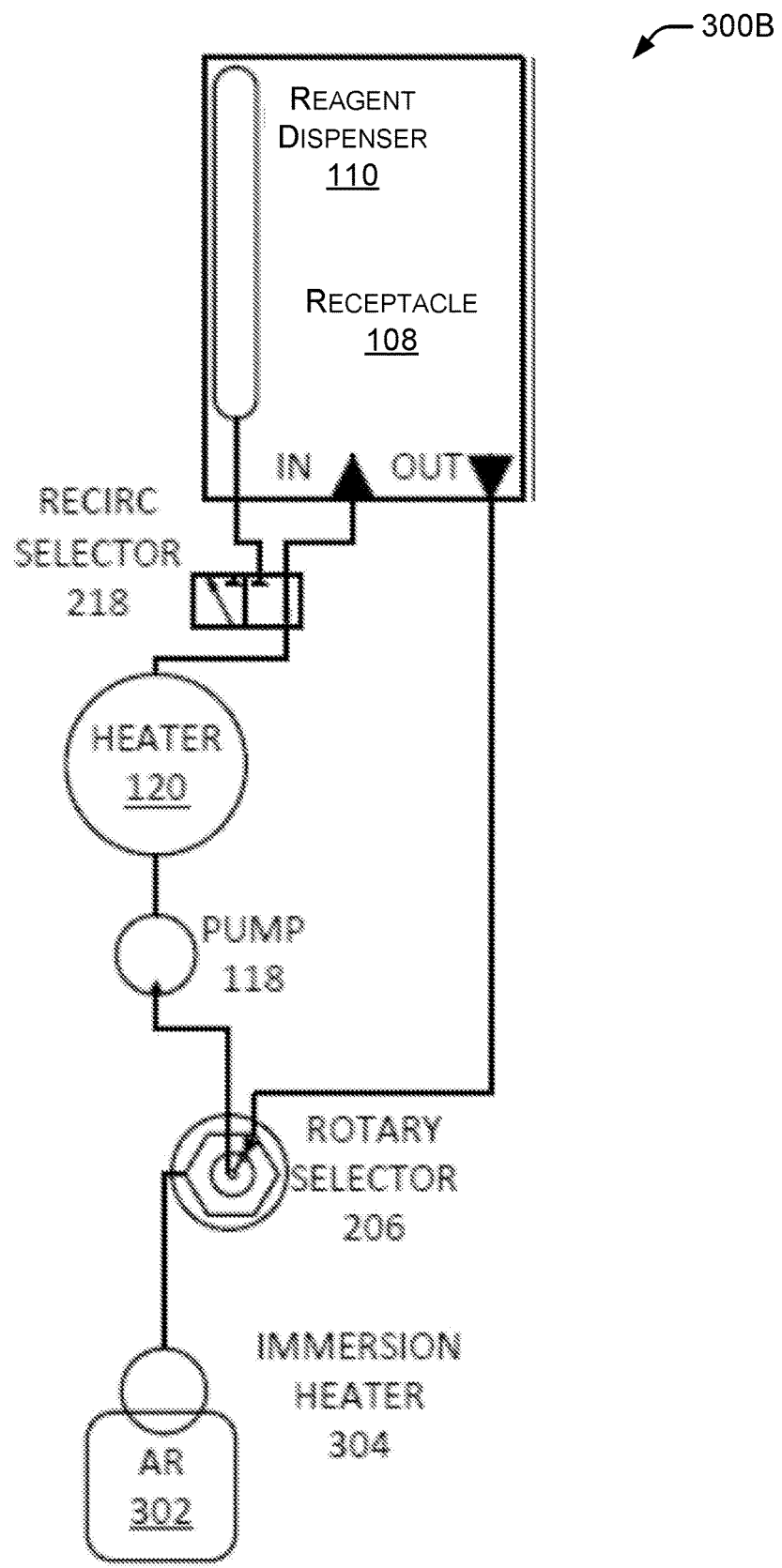

FIG. 3B shows a fluidics diagram 300B that differs from the implementation of FIG. 3A by the addition of an immersion heater 304 that can heat the AR solution 302 while in its bulk storage tank. Use of the immersion heater 304 reduces the extent to which the heater 120 must raise the temperature of the AR solution 302 or other reagent.

Figure 3C:
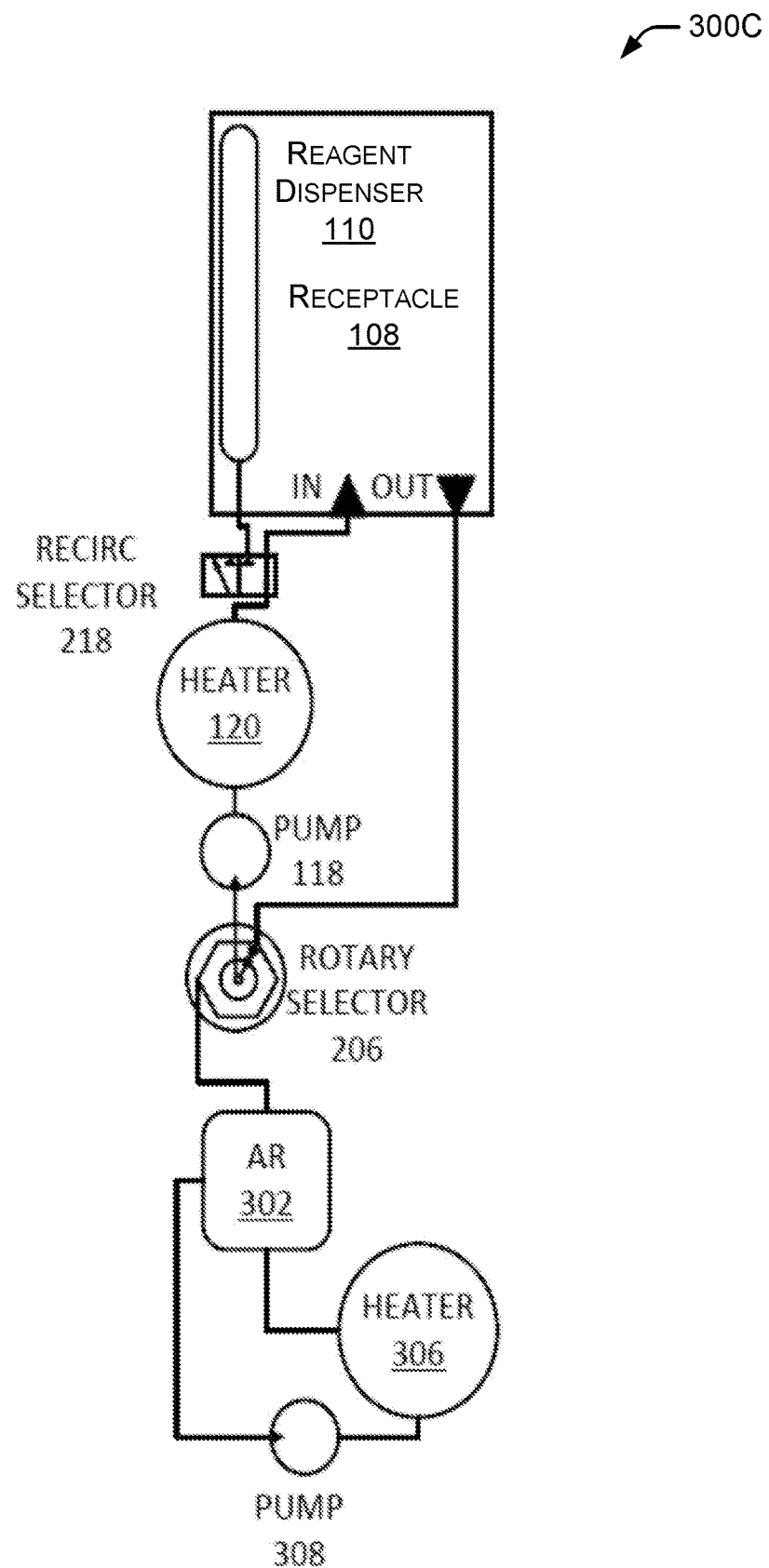

FIG. 3C shows a fluidics diagram 300C that replaces immersion heater 304 of FIG. 3B with a second heater 306 and a second pump 308 that form a recirculating loop to heat the AR solution 302 in the bulk storage tank.

Figure 3D:
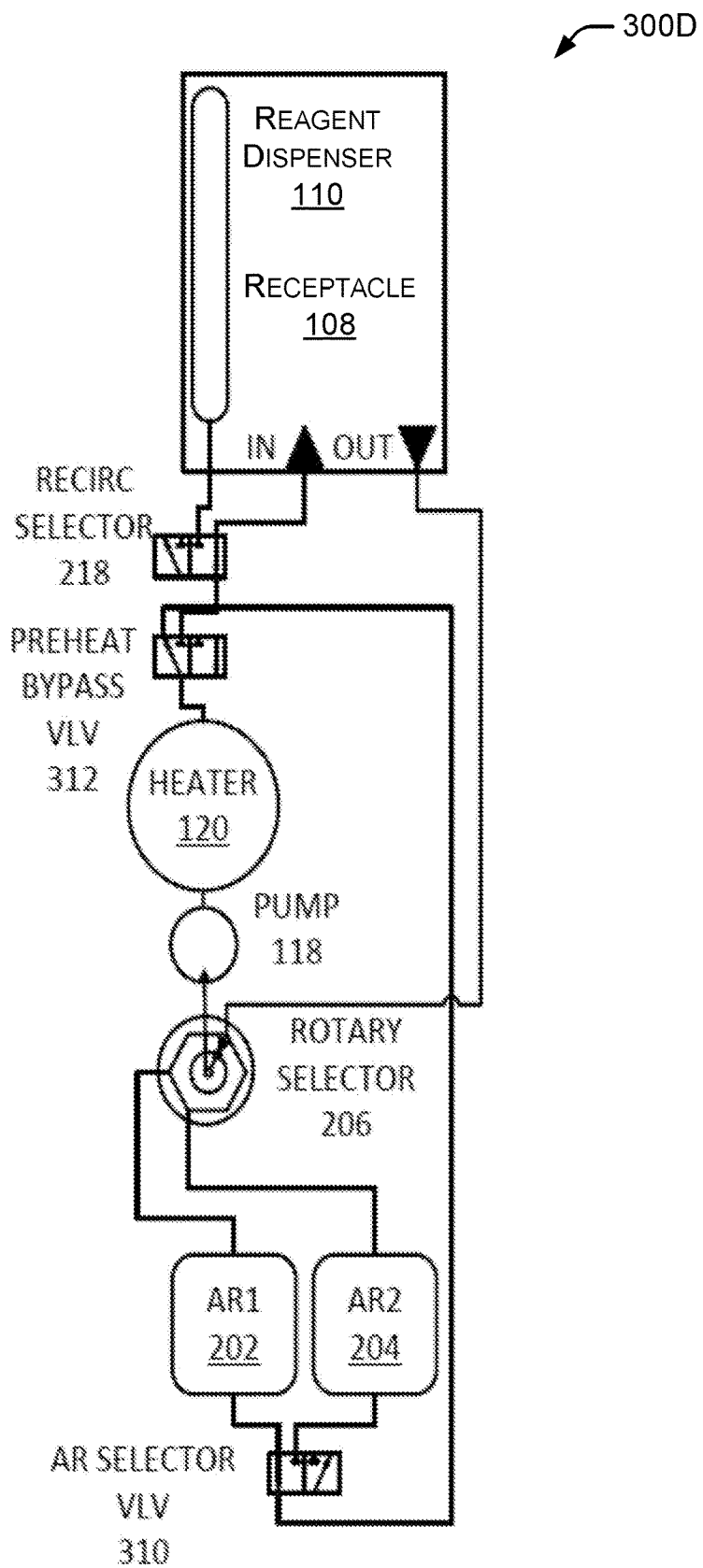

FIG. 3D shows a fluidics diagram 300D that includes two antigen retrieval solutions similar to FIG. 2 and a fluid path that bypasses the heater 120. A similar architecture may be used to accommodate more than two antigen retrieval solutions. If the heater 120 is bypassed, an antigen retrieval selector valve 310 is activated to select which of the antigen retrieval solutions AR1 202 or AR2 204 will be used. A preheat bypass valve 312 connects the unheated antigen retrieval solution to either the reagent dispenser 110 or to the receptacle 108.

The architecture of the biological sample processing system 100 can vary depending on cost of the various components, available space within the instrument chassis, and the degree of flexibility required to route different bulk fluids to different dispensers. The conceptually simplest configuration is to have a dedicated pump 118, heater 120, and recirculation switching valve 218 for each reagent dispenser 110. This is illustrated in FIG. 3A. In such a system, each reagent dispenser 110 is dedicated to a single bulk fluid and there is no need for a trunk line to distribute bulk fluid to multiple different reagent dispensers 110. Such architecture can be made more flexible by including an input switching valve such as a rotary selector 206 to allow each reagent dispenser 110 to draw from any one of a variety of bulk fluids (e.g., AR1 202, AR2 204, buffer 210, or distilled water 212). The number of different bulk fluids is limited only by the number of channels on the input valve (e.g., rotary selector 206). The drawback to this architecture is the need for the same number of pumps 118 and heaters 120 as there are reagent dispensers 110, which can increase cost.

An alternative architecture for the biological sample processing system 100 is to use a single heater 120 and pump 118 that are multiplexed across multiple reagent dispensers 110 via a trunk line and valves for each reagent dispenser 110. This architecture minimizes the cost of the heater 120 and pump 118 components but reduces the flexibility of the system by eliminating the possibility of dispensing more than one bulk fluid to the reagent dispensers 110 at a time.

Another alternative architecture is to use a dedicated heater 120 and pump 118 for each bulk fluid (e.g. AR1 202, AR2 204, buffer 210, and distilled water 212). Since the number of bulk fluids may be fewer than the number of reagent dispensers 110, this architecture lowers the cost of the pumps 118 and heaters 120 compared to the first architecture but it still requires trunks and switching valves connecting the reagent dispensers 110 to the different bulk fluids to be run at the same time.

Still another alternative architecture is to use a dedicated heater 120 for each bulk fluid along with a dedicated pump 118 for each reagent dispenser 110. This architecture lowers the number of heaters 120 compared to the first architecture and can reduce the number of switching valves because the pumps 118 can be used to independently shut off each reagent dispenser 110.

The various embodiments of the biological sample processing system 100 may incorporate additional pumps, valves, and heaters necessary to dispense distilled water, buffers, and other reagents for serial immunofluorescence and other assays that require heated fluids for tissue treatment after and/or in place of traditional antigen retrieval.

It will be clear to those skilled in the art that a wide variety of heater/pump/valve combinations can be employed depending on the constraints of cost, space, serviceability, and reliability that must be achieved by a particular embodiment of the biological sample processing system 100.

FIG. 4 shows detailed views of selected components of the biological sample processing system 100. As discussed above, the holder 102 may be implemented as a slide rack 400 and the substrate 104 may be implemented a microscope slide 402. The reagent dispenser 110 may be implemented as a manifold 404 configured to dispense the reagent 112 simultaneously onto a microscope slide 402 and at least one additional microscope slide. The receptacle 108 may be implemented as a trough configured to sit beneath the length of the slide rack 400.

The microscope slides 402 may be any suitable size such as, for example, 75×50 mm, 75 mm×25 mm, 46×27 mm, or 48×28 mm. The microscope slides 402 may be made of clear or transparent material such as soda lime glass, borosilicate glass, or optical quality plastic. In one implementation the microscope slides 402 have dimensions of about 76×25 mm, a thickness of about 1.0 mm and 90° ground edges.

The microscope slides 402 may be held in groups of 12 in the slide rack 400 and each slide rack 400 is associated with a manifold 404 that can dispense any of multiple AR solutions, thereby allowing different slide racks 402 to be subjected to different antigen retrieval solutions at different times or not at all. In various implementations the number of microscope slides 402 in a slide rack 400 may be greater or fewer than 12. There is no upward limit imposed on a number of microscope slides 402 in a slide rack 400 other than limits of a power system to supply sufficient energy to heat a sufficient volume of AR solution for washing the microscope slides 402.

In one implementation, the manifold 404 may be shaped as a tube with a plurality of orifices positioned above corresponding spaces in the slide rack 400. For example, the manifold 404 may be constructed with a length of 12 mm outside diameter rigid plastic tubing positioned parallel to the slide rack 400 and raised about 1 to 10 mm above the slide rack 400. When constructed to this scale, heated AR solution may flow out of ~1 mm orifices in the manifold 404 at a rate of approximately 1 ml/sec per slide 402. Due to the positioning of the manifold 404 relative to the slides 402, the AR solution may strike the slides near one end. The raised position of the manifold 404 and angling of each AR jet towards the slides 402 facilitates both the complete spreading of the AR solution over the tissue section(s) or other biological sample(s) and improves the uniformity of slide 402 heating via circulation of the heated AR solution on the slide surface. Once the AR jet leaves the manifold 404 the horizontal component of the AR solution's momentum carries it down the length of the slide 402 while the vertical component of the momentum causes the AR solution to spread from the point of impact outward towards the edges of the slide 402. Once the AR solution reaches the slide boundaries, viscosity and surface tension of the AR solution lead to the formation of eddy currents on the slide surface and the AR solution transfers heat to the slide 402.

If the microscope slides 402 are level, both relative to each other and in an absolute sense relative to gravity, the light mineral oil and other liquids applied to the microscope slides 402 can distribute evenly. Level microscope slides 402 also prevent liquids from pooling or running off the microscope slide 402 completely, both of which are detrimental to staining effectiveness and uniformity. In one implementation, microscope slides 402 are maintained in a level orientation via passive means through the use of fixtures within the instrument as well as adjustable legs for leveling the instrument as a whole. Further techniques for maintaining the level of the microscope slides 402 are discussed below.

The microscope slides 402 may be maintained in a level configuration via the design of the slide rack 400, which consists of a frame of material incorporating a three dimensional guide formation for each microscope slide 402. The guide formations are milled, molded, or otherwise formed in the slide rack 400. The guide formations may include open slots to accommodate the label end of each microscope slide 402 as well as a spring clip to hold the microscope slide 402. When the label end of a microscope slide 402 is inserted into the open slot, the microscope slide 402 is forced to assume the correct spacing and a parallel orientation relative to its nearest neighbors. The spring clip positively grips the microscope slide 402 to prevent it from moving within the slide rack 400. The spring clip applies downforce on the microscope slide 402, causing it to lie against and parallel to a flat guide surface underneath the microscope slide 402. The under-slide guide surface forces all the microscope slides 402 in the same slide rack 400 to lie parallel to each other.

Continuous Dispense Reagent

In one implementation, the reagent 112 may be continuously dispensed onto a substrate 104 supporting a biological sample 106. Continuously dispensing the reagent 112 exposes the biological sample 106 to fresh reagent 112.

Figure 5:
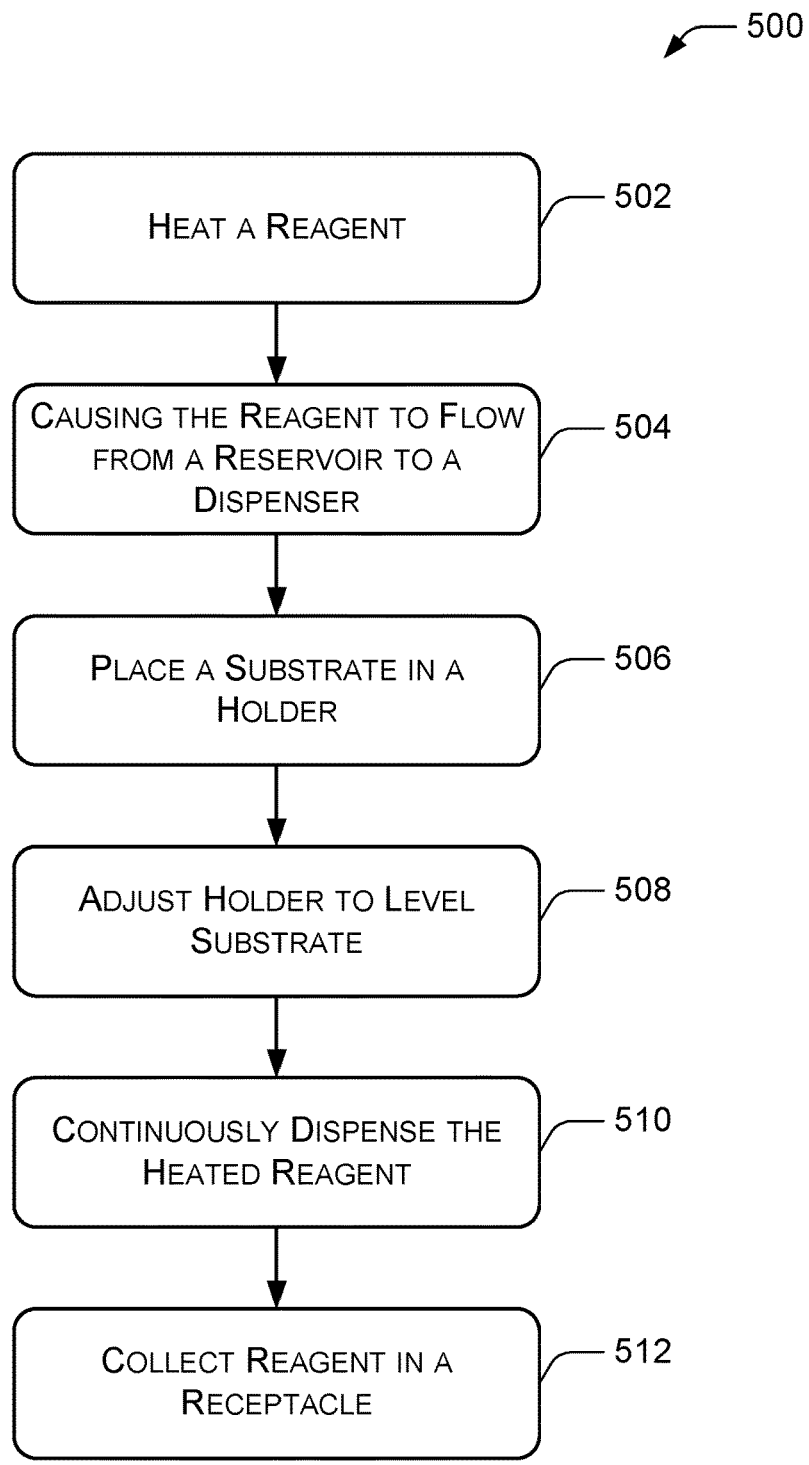
FIG. 5 is an illustrative method for continuously dispensing a reagent to a biological sample.

FIG. 5 shows an illustrative method 500 for continuously dispensing a reagent 112 according to the techniques of this disclosure. As described above, processing of a biological sample 106 may include contacting the biological sample 106 with a liquid reagent.

At 502, a reagent 112 is heated. The reagent 112 may be heated to reduce viscosity and improve flow, to increase a reaction rate, decrease processing time, to increase the ability of the reagent 112 to solvate other compounds, or for other reasons. The reagent 112 may be heated by the heater 120.

In one implementation, the reagent 112 is AR solution that heated close to the boiling point (~95° C.) via a remote flow-through heater 120 that acts on the AR solution as it is pumped towards a reagent dispenser 110. Slightly higher temperatures can be employed to reduce the AR treatment time but the boiling temperature of an aqueous solution varies with altitude. In order to achieve a consistent degree of antigen retrieval with the same protocol from instrument-to-instrument between laboratories at sea level and those at high altitudes (e.g. San Francisco versus Denver) method 500 may be performed at a temperature that can be achieved wherever the process is performed, regardless of altitude. The AR solution may be heated from ambient temperature to its working temperature in a single pass through the heater 120 but this can only be achieved under certain circumstances. An AR solution at room temperature (~22° C.) requires approximately a 75° C. rise in temperature for slide treatment, which a 1 kW heater can achieve in a single pass of the solution at a maximum flow rate of ~13 ml/sec. While this is sufficient for the 12 ml/sec flow required by a single slide rack 400 containing 12 slides 402, it will not suffice for two or more slide racks 400 undergoing antigen retrieval at the same time. In some configurations, a more powerful heater 120 cannot be employed due to the ~1800 W limitation of standard building power circuits, which also precludes the use of multiple 1 kW heaters operating simultaneously. Thus, the limits of standard building power circuits impose design constraints.

At 504, the reagent is caused to flow from a reservoir to a reagent dispenser. The reagent may be caused to flow by opening a fluid path and/or by activating a pump. The fluid path may be the recirculation path as shown in any of FIGS. 1-4.

At 506, a substrate supporting a biological sample is placed in a holder. In one implementation, the substrate may be a microscope slide 402 supporting a tissue slice in the microscope slide 402 is placed into a slide rack 400.

At 508, a position of the holder 102 may be adjusted so that the substrate 104 is level. The adjustment may include changing the level of the holder 102 or changing the level of the entire biological sample processing system 100 in order to level the holder 102.

At 510, the heated reagent 112 is continuously dispensed from the reagent dispenser 110 onto the biological sample 106. This may cover the biological sample and the substrate with a layer of the reagent.

During continuous dispensing of a reagent 112, such as AR solution, a fractional volume of the reagent may be lost to evaporation, increasing the concentration of the remaining reagent 112. This is not a problem if the working volume of reagent 112 is large enough to accommodate the increase in concentration without significantly affecting overall concentration. However, in some implementations such as recovery and reuse of the reagent 112 for processing multiple batches of biological samples 106, the evaporation may eventually lead to an unacceptable increase in concentration of the reagent 112. Therefore, in some implementations the lost volume may be replenished periodically to maintain the original concentration by addition of distilled water 212 or a buffer 210, either during dispensing of the reagent 112 or following it. The volume of distilled water 212 or buffer 210 necessary to restore the original concentration of the reagent 112 may be determined in any of several ways including:
1. monitoring the ambient temperature and humidity along with the time and temperature of the reagent process to calculate the amount of evaporation,
2. using an optical sensor to monitor a change in pH via a change in the color and optical density of a reagent that incorporates a pH sensitive dye, and/or
3. using a level sensor in a reservoir for the reagent to measure the lost volume directly.

Of the three techniques, the level sensor can also be used to determine when the necessary working volume of the reagent 112 has been drawn from a bulk reservoir at the start of the processing and thereby trigger the transition to recirculating operation.

It will be clear to those skilled in the art that the temperature of the reagent 112 may cover a wide range, for example from room temperature up to the boiling point of the reagent 112. Further, the reagent 112 may have a wide range of pH, from extremely basic to extremely acidic. In addition, the detergent species and concentration of detergent in the reagent 112 may range from none at all to a high concentration (e.g., ~10%). Multiple detergents may be combined in a reagent 112 in order to achieve the desired biological sample processing characteristics and foam formation.

In one implementation, the reagent 112 may be continuously dispensed onto each biological sample 106 for the duration of the processing. Many types of biological processing, such as antigen retrieval, use heated solutions so the biological sample processing system 100 may include the heater 120 for heating the reagent 112 prior to dispensing the reagent 112 onto a biological sample 106. The biological sample processing system 100 may also dispense room temperature reagent either by circulating the reagent 112 without activating the heater or circulating the reagent 112 through a path that it does not go through the heater 120, for example, as shown by the bypass path in FIG. 3D.

At 512, the reagent 112 that flows off of the biological sample 106 is collected in the receptacle 108 located beneath the holder 102. Though the reagent 112 could conceivably be dispensed continuously on the substrate 104 and then immediately discarded, the large volume of reagent 112 this would require, along with the large amount of energy necessary to heat this volume of solution from room temperature makes it desirable to recirculate the heated reagent 112 after its application to the biological samples 106. One implementation incorporates the pump 118, the flow-through heater 120 that heats the reagent 112 as it is pumped towards the reagent dispenser 110 that continuously dispenses the reagent 112 onto each slide rack being processed, the receptacle 108 to collect the AR solution as it runs off the slide rack, and a valve system to route the reagent 112 from the receptacle 108 back to the heater 120 for re-heating and re-application to the biological samples 106. After the initial filling of the reagent dispenser 110 and receptacle 108 from a bulk reagent carboy, a valve may switch the pump input from the bulk reagent carboy to a drain 222 on the receptacle, thereby causing the recirculation of heated reagent 112 from the receptacle 108.

In order to work within the 1 kW heater power limitation discussed above as well as to reduce AR solution consumption, one technique collects the AR solution after it has run off the slides via the under-rack receptacle 108 and repeatedly recirculates the AR solution through the heater 120 and back into the reagent dispenser 110 using a working volume of 250-500 ml per 12-slide slide rack 400. In a scenario of four slide racks 400 undergoing AR at the same time, the biological sample processing system 100 has to heat ~1.5 liters of AR solution to 95° C. and sustain that temperature at a flow rate of ~50 ml/sec through the heater 120. With 1 kW of heater power and a 1.5 L working volume, the AR solution requires a minimum of four passes through the heater 120 to reach working temperature. With a flow rate of 50 ml/sec, each pass takes 30 seconds so a total of 120 seconds is required to reach operating temperature. In practice, the 48 slides themselves must also be heated to working temperature and have a combined thermal mass equivalent to ~500 ml of solution. In addition, a portion of the slide rack 400 itself saps heat from the AR solution due to incidental contact and the AR solution itself loses heat to the atmosphere during the collection and recirculation process. Taking into account these other heat sinks, it may take at least 5 minutes to reach working temperature with four slide racks 400 undergoing AR at the same time.

In one implementation, two different AR solution formulations may be employed so each slide rack 400 can use the optimal AR formulation for the slides loaded thereon. Each AR solution will be heated by a dedicated 1 kW heater and pump with valving that controls which reagent dispenser 110 receives which AR solution, if any. An alternative implementation, as shown in FIG. 3D, uses a dedicated heater and pump for each of the reagent dispensers 110 rather than for each of the two AR solutions, thereby trading the cost of extra heaters and pumps for greatly simplified plumbing and control logic. Regardless of the heater architecture employed, the issue arises that two 1 kW heaters cannot, without some modification to the system, be in operation at the same time due to power budget restrictions of standard AC mains circuits. Use of lower power heaters extends the time necessary to come up to working temperature at the beginning of the AR process. One technique to address the need for multiple heaters to operate in parallel is a time division multiplexing strategy wherein each of N heaters will be operated with a duty cycle than never exceeds 1/N. Power is sent sequentially to each of the N heaters with a time division resolution that limits temperature swings in the AR solutions to less than a threshold range which may be 1, 2, 3, 4, or 5° C. During a given heater's power-enabled period its operation may be controlled by a proportional/ integrative/derivative (PID) system taking feedback from a first temperature sensor at the heater output and a second temperature sensor at the heater input. A PID controller continuously calculates an error value e(t) as the difference between a desired temperate and a measured temperature and applies a correction based on proportional, integral, and derivative terms (sometimes denoted P, I, and D respectively) which give their name to the controller type.

In one implementation the fluid in the receptacle 108 and reagent dispenser 110 acts as the working volume of reagent solution. Since the reagent dispenser 110 and plumbing are poor heat conductors, most of the heat lost in the biological sample processing is lost from the exposed reagent 112 on the substrate 104 and in the receptacle 108. Alternative implementations may incorporate a day tank (i.e. a small reservoir) in the recirculation system that allows the receptacle 108 to be run with a minimal volume of heated reagent 112 to reduce heat loss while still having enough working volume for the system to operate reliably. Still other implementations may use the bulk reagent carboy itself as the day tank and do away with the valve (e.g., the rotary selector 206) necessary to switch from the initial fill to recirculation, trading simplified plumbing for longer initial heating times due to the larger volume of reagent 112 being heated. In such implementations, the reagent 112 may be preheated with an immersion heater as shown in FIG. 3B or with a separate closed loop heating system as shown in FIG. 3C. Heating the reagent 112 in the bulk carboy may reduce or eliminate the need for the in-line heater 120.

Systems incorporating multiple different ones of implementations described above are also contemplated and such systems may be changed from one configuration to the other by an operator. It is also contemplated that a recirculation selector valve (e.g., recirculation selector 218) may be incorporated to allow the receptacle 108 to be filled with reagent 112 instead of sending the reagent 112 directly to the reagent dispenser 110 for dispensing on the substrate 104. This implementation would allow the reagent 112 to be preheated by recirculation through the heater 120 during a dewax process (before there is a need to apply the reagent 112 to the biological samples 106), thereby saving end-to-end slide treatment time.

Following the AR process, the AR solution is either discarded or pumped back into the bulk solution carboy for re-use, depending on the operator's preference.

Continuous dispense AR (or other type of reagent 112) as described in this disclosure has the following characteristics:
1. it is thermally efficient because the hot AR is applied directly to the tissue section being processed rather than heating AR indirectly from underneath a slide,
2. it allows for remote heating of the AR solution to isolate the heating element(s) from the wet and corrosive environment in close proximity to the slides,
3. it eliminates the need for a slide cover to prevent drying of the tissue, thereby reducing process complexity and waste,
4. it speeds the AR process because the constant relative motion between the AR solution and the tissue has favorable reaction kinetics compared to a static AR solution bath, and
5. it increases tissue staining uniformity by constantly flooding the entire slide with hot AR solution, thereby reducing the temperature gradient of the AR solution across the slide.

Mineral Oil Dewaxing

Light mineral oil dissolves paraffin wax at room temperature without the need for agitation up to a saturating concentration of ~2% (v/v). For a 1 ml volume of light mineral oil, this corresponds to the dissolution of up to 20 µl of wax at saturation. The largest tissue section a standard microscope slide can accommodate is approximately 5 cm long by 2 cm wide and typically has a thickness of less than 5 µm. A solid section of wax with these dimensions has a volume of 5 µl, of which a significant fraction is comprised of tissue rather than wax. As a result, 1 ml of mineral oil has at least four times the wax carrying capacity needed for a tissue section on a standard microscope slide.

By "wax" is meant a composition used in the histochemical art for embedding biological specimens for histochemical or other analyses that is solid at room temperature. A wax may consists of a complex mixture of higher hydrocarbons often including esters of higher fatty acids and higher glycols. Wax as used herein may be natural or synthetic in origin. A wax can optionally contain additives that enhance its specimen-embedding properties. Paraffin is an example of a mineral wax commonly used in the histochemical field. Paraffin is typically prepared by distillation of petroleum, and is a mixture of primarily solid saturated hydrocarbons. Paraffin is a white or colorless soft solid derivable from petroleum, coal or oil shale, that consists of a mixture of hydrocarbon molecules containing between twenty and forty carbon atoms. It is solid at room temperature and begins to melt above approximately 37° C.; its boiling point is >370° C.

In this context, "light mineral oil" is a mixture of higher alkanes having nine or more carbon atoms, higher alkanes having from 9 to 40 carbon atoms, cycloalkanes, or a combination thereof. In one implementation, approximately 1 ml of light mineral oil is dispensed on each slide, which is supported in a flat and level orientation. The light mineral oil spreads spontaneously over the slide and tissue. The light mineral oil starts to dissolve the wax without the need for elevated temperatures or long incubation times.

Figure 6:
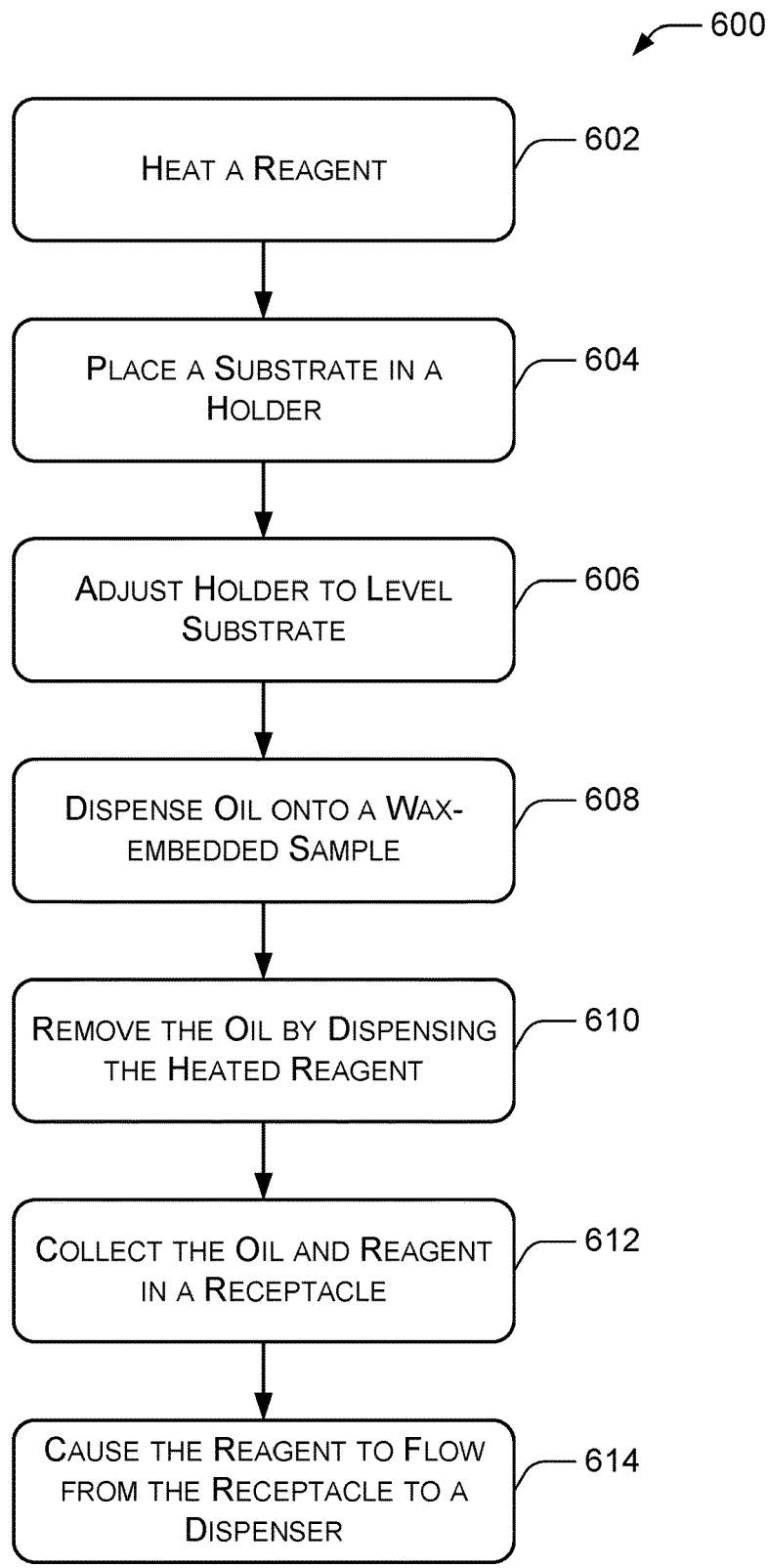
FIG. 6 is an illustrative method for dewaxing a biological sample.

FIG. 6 shows an example method 600 for dewaxing a wax-embedded biological sample such as fixed tissue sample.

At 602, a reagent 112 is heated. The reagent 112 may be AR solution or another reagent that is to be applied to dewaxed biological samples.

At 604, a substrate 104 supporting the wax-embedded biological sample is placed in a holder 102. The substrate 104 may be a microscope slide and the holder 102 may be a slide rack.

At 606, the holder 102 is adjusted to level the substrate 104. Leveling of the holder 102 may be performed in some implementations by adjusting the level of an instrument structural frame as described below.

At 608, light mineral oil 116 is dispensed onto the wax-embedded biological sample. The light mineral oil 116 may be dispensed by the reagent dispenser 110.

At 610, the light mineral oil is from the wax-embedded biological sample by dispensing the heated reagent 112 from a reagent dispenser onto the wax-embedded biological sample. After dewaxing, the light mineral oil may be removed by flushing the substrate 104 with another liquid. In one implementation the light mineral oil 116 is displaced from the biological sample 106, the substrate 104, and the holder 102 by flushing with the heated reagent solution 112, which itself runs off the substrate 104 as it is continuously applied. Alternatively, the light mineral oil may be removed by washing with warm distilled water or buffer.

The antigen retrieval process, or other application of a reagent 112, may be performed using continuous dispensing of a heated reagent onto the biological samples 106 for all or most of a processing cycle. The reagent 112 may be used to wash light mineral oil off any biological samples 106 that were previously dewaxed.

At 612, the light mineral oil and the reagent 112 are collected in a receptacle 108 underneath the substrate 102 supporting the biological samples 106. In some implementations the reagent 112 is an aqueous solution that has a greater density than the light mineral oil. Thus, the light mineral oil will float on top of the reagent 112 in the receptacle 108. The layer of light mineral oil may provide a thermal insulation layer that traps some of the heat in the reagent 112 within the receptacle 108. Reducing heat loss from the reagent 112 in the receptacle 108 reduces the amount of power needed to reheat the reagent 112 to a target temperature.

At 614, the heated reagent 112 is caused to flow from the receptacle 108 back to the reagent dispenser. The reagent 112 may be recirculated by opening a fluid path from the receptacle 108 to the reagent dispenser or by activating a pump that moves uses an already-open fluid path to move the reagent 112. The fluid path may include a flow-through heater 120 that heats the reagent.

Hybrid Power System

Figure 7:
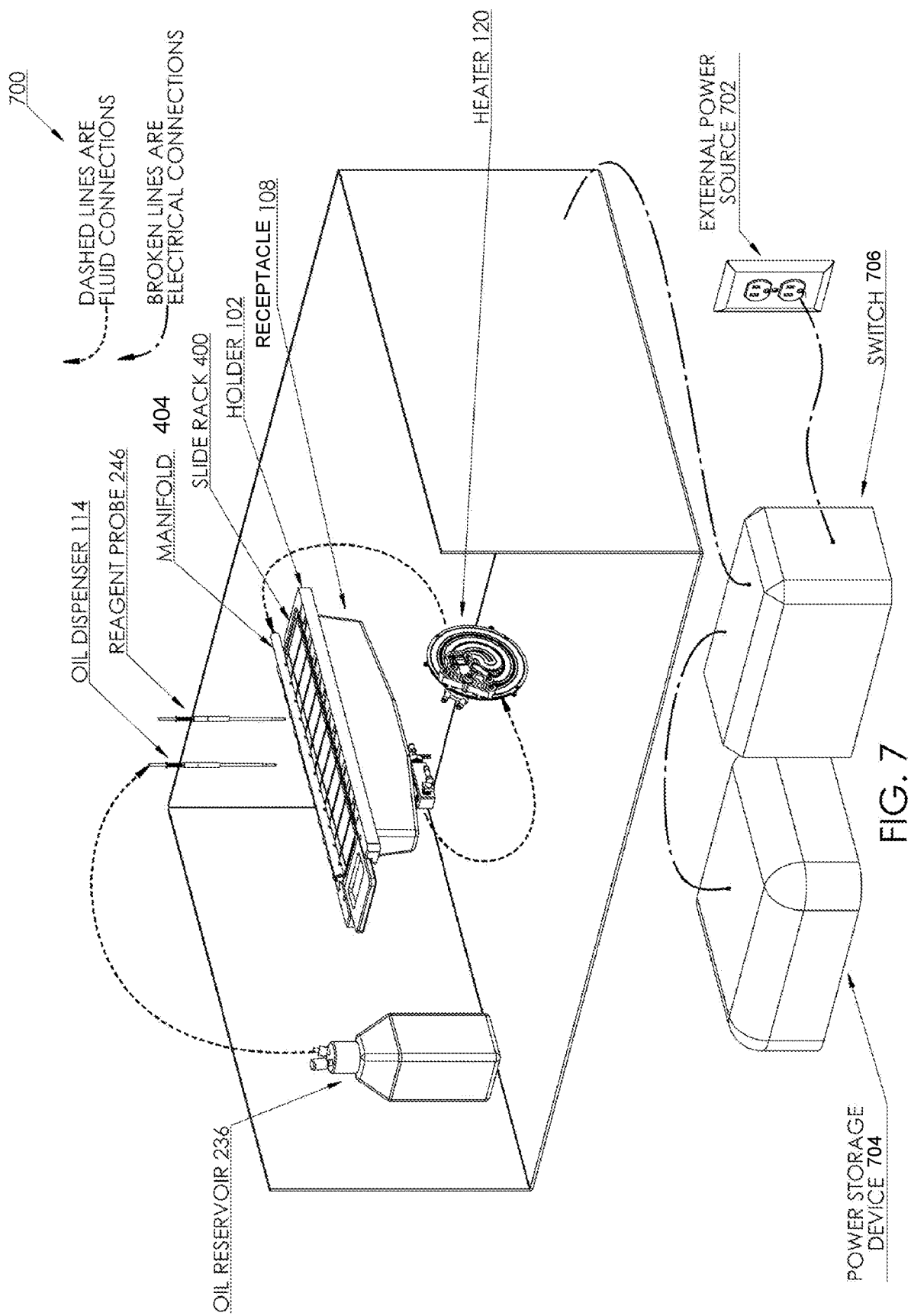
FIG. 7 is a perspective view of an example biological sample processing system that includes a hybrid power system.

FIG. 7 shows a schematic view of a hybrid power system 700 that allows the biological sample processing system 100 to operate for limited times at a level of peak power consumption that exceeds the power available from external power source 702. The external power source 702 may be an outlet or other connection to the electrical system of a building. Thus, the external power source 702 may be an AC mains circuit. In some implementations, external power source 702 may be a generator, a fuel cell, or another power source dedicated in whole or in part to powering the biological sample processing system.

In the U.S. and many parts of the world a standard electrical circuit cannot continuously deliver much more than 1800 W. For a system that delivers heated AR solution to tissue sections as described herein, when the power requirements of the remainder of the instrument are considered, imposes a practical limit of AR on 30 slides at a time. This limits the batch size of one processing cycle to only 30 slides. The hybrid power system 700 described herein can address that limitation by can providing additional power at times of peak need.

The antigen retrieval system described herein uses different amounts of power during different portions of the processing cycle. Taking antigen retrieval as an example, and not limitation, applying heated AR solution typically constitutes only 30-45 minutes out of a total dewax/antigen retrieval/staining process duration of 150-250 minutes. Because of the need to heat the slides and or the antigen retrieval solution during antigen retrieval, the vast majority of instrument power consumption occurs during a first portion of the processing cycle, the antigen retrieval stage, due to the power demands of the heater 120. Therefore the slide capacity of conventional instruments is dictated by the peak power demand during antigen retrieval. However, the short duration of the antigen retrieval stage relative to the length of a second portion of the processing cycle with lower power demands makes it possible to utilize a power storage device 704 to temporarily exceed the power available from the external power source 702. Once the AR stage is over, the relatively low (as compared to peak) power demand of the instrument thereafter allows the power storage device 704 to be recharged before the staining process is complete, thereby allowing a subsequent staining run to be started and with the ability to draw on the power storage device 704 once again. An instrument designed in this manner allows the use of more powerful heaters 120 for faster operation and/or more numerous heaters to allow the processing of more biological samples in parallel. This need for peak power during only a portion of an operational cycle is not unique to this antigen retrieval system and the hybrid power system described herein may be used with other instruments unrelated to antigen retrieval.

The hybrid power system 700 may draw more power from the external power source 702 than consumed by the instrument during operations that do not use the heater 120. The additional power is stored by the instrument or by an auxiliary device separate from the main instrument in the power storage device 704. Power may be stored in the power storage device 704 electrically, chemically, mechanically, or by other means. Electrical energy may be stored in a battery or other mechanism for storing electrical energy known to those of skill in the art. Any type of suitable rechargeable storage medium may be used such as a lithium-iron-magnesium-phosphate battery, a lithium ion battery, a lithium polymer battery, a lead acid battery, a nickel-metal hydride (NiMH) battery, a nickel cadmium (NiCd) battery, a supercapacitor, etc. Chemical energy may be stored, for example, through hydrolysis of water into hydrogen and oxygen in a fuel cell. Mechanical energy may be stored by any of multiple techniques known to those of skill in the art such as a flywheel, elevating a mass, pumping water to a higher location, compressed air storage, etc. By having stored power available, the hybrid power system 700 is able to draw on both the external power source 702 and the power storage device 704 when the heaters 120 draw current.

A switch 706 can direct power coming from the external power source 702 to one or both of the remaining systems of the instrument or to the power storage device 704. In one implementation, the switch 706 may be a "hybrid" inverter-charger. One example being the Magnum MSH4024M from Sensata Technologies which may be combined with rechargeable batteries as the power storage device 704. The hybrid inverter-charger may be connected to an AC mains circuit as the external power source 702. The hybrid inverter-charger can supply power to the batteries and supply AC power to the instrument. Unlike a conventional inverter-charger, which powers an AC load either by passing through AC power from the mains circuit or by inverting the DC power from the battery, a hybrid inverter-charger can power an AC load by drawing from both the battery and the mains circuit simultaneously. In so doing, the hybrid inverter-charger can supply more power to the instrument than either power source alone would allow. Thus, when the instrument draws a load greater than a threshold load, which may be set as the load that can be supported solely by the external power source 702 or some fraction thereof, the hybrid inverter-charger may direct electricity from the power storage device 704 to the electrical systems of the instrument.

As an example, a 48-slide capacity instrument incorporating four 750 W heaters requires 3000 W of heater power. A typical mains circuit in the United States can supply 15A of current at a nominal 120V, for a total of 1800 W, leaving a 1200 W power deficit. Thus, the heaters constitute a load that is greater than the external power source can serve. Typically, several hundred watts must also be budgeted for powering the other functions of the instrument, so the effective power deficit is approximately 1500 W. In an implementation, the hybrid inverter/charger 706 may be connected to a nominal 24 VDC battery system 704. In order to cover the 1500 W deficit, the batteries must therefore supply at least 62.5 A of current. Battery capacity is typically specified in amp-hours and because the antigen retrieval step requires 45 minutes, the battery system in this example must have a capacity of at least 47 Ah.

The hybrid inverter-charger 706 may be configured to run in a mode that prioritizes use of AC power from the external power source 702 over use of DC power from a power storage device 704. Control logic may cause the hybrid inverter-charger 706 to draw current from the power storage device 704 only after the power demand of the instrument exceeds a set ampere threshold (e.g., 15 A) and only to the degree that the demand exceeds the threshold. The hybrid inverter-charger 706 may then start drawing electricity from the power storage device 704 to maintain a set voltage (e.g., 120V) output required by the instrument. The control logic will adjust the use of electricity from the power storage device 704 to maintain the set voltage as the load from the instrument changes. If, however, the external power source 702 stops, such as in a power outage, the control logic can change the operation of the hybrid inverter-charger 706 to draw exclusively from the power storage device 704 until the AC power returns or the power storage device 704 is depleted. If the power storage device 704 is fully or partially depleted and the load drawn by the instrument is less than that provided by the external power source 702, the control logic will use the external power source 702 to recharge the power storage device 704. The load drawn by the instrument when the heater 120 is not in use may be about 200-400 W which is well less than 50% of the 1800 W that may be supplied by the external power source 702 and may even be less than 25% of the load that can be supported by the external power source 702.

The specific battery technology employed bears heavily on the sizing of a battery bank that may be used as the power storage device 704. For example, flooded lead acid (FLA) batteries cannot be discharged below 50% of their rated capacity without significantly reducing the number of charge/discharge cycles they can tolerate, so a FLA battery system must have at least double the nominal capacity requirements, approximately 100 Ah in this example. Further, the capacity of an FLA battery is typically specified at a discharge rate that would fully deplete the batteries over 20 hours. In the current example, full discharge would occur in 90 minutes so the actual capacity of the FLA battery may only be 60% of the 20 hour rate. This means the necessary battery capacity must rise further to approximately 165 Ah, increasing the size, weight, and cost of the system. In addition to depth and rate of discharge considerations, limitations on the rate of charge can affect the utility of the system. In the case of FLA batteries, the maximum allowed charge rate is typically 10% of the 20 hour discharge rate. A 165 Ah battery that is discharged by 50% will require over 82.5 amp-hours during recharge and since 10% of the 20 hour discharge rate corresponds to 33A, recharging will require a minimum of 2.5 hours. However, FLA batteries cannot be recharged fully at the maximum rate of charge and require a slow "float charge" for the final ~30% of their capacity. As a result, FLA batteries commonly require five hours or more to fully charge after a 50% discharge. This would require the operator of the slide stainer to wait an hour or more following the processing of a slide batch before running a subsequent batch of slides.

An alternative to FLA batteries are lithium-iron—magnesium-phosphate (LiFeMgPO4) batteries. Such batteries are typically much smaller and lighter for the same capacity as FLA batteries and their discharge capacity is largely independent of the rate of discharge. An example battery suited to serve the 47 Ah power needs of a slides staining instrument would be the Valence U27-24XP, which has a 69 Ah capacity. In operation, this battery would be discharged by ~70% but would still provide over 5,000 charge/discharge cycles, which exceeds the anticipated needs of a biological sample processing device over the life of the instrument. LiFeMgPO4 batteries can be recharged at half their rated capacity, which allows a full recharge in 2.5 hours including a period of charge balancing of the cells comprising the battery. This short recharge cycle eliminates the need for any waiting period following the staining of a batch of slides.

Other factors that affect the necessary battery capacity include the actual rather than nominal mains voltage, the inverter's efficiency, the actual rather than nominal battery voltage over the course of discharge, the duration of any AR pre-heat period, the duty cycle of the heaters necessary to maintain AR temperature during operation, the actual power needs of the remainder of the instrument, the temperature of the operating environment, and numerous other factors.

Self-Leveling System

Figure 8:
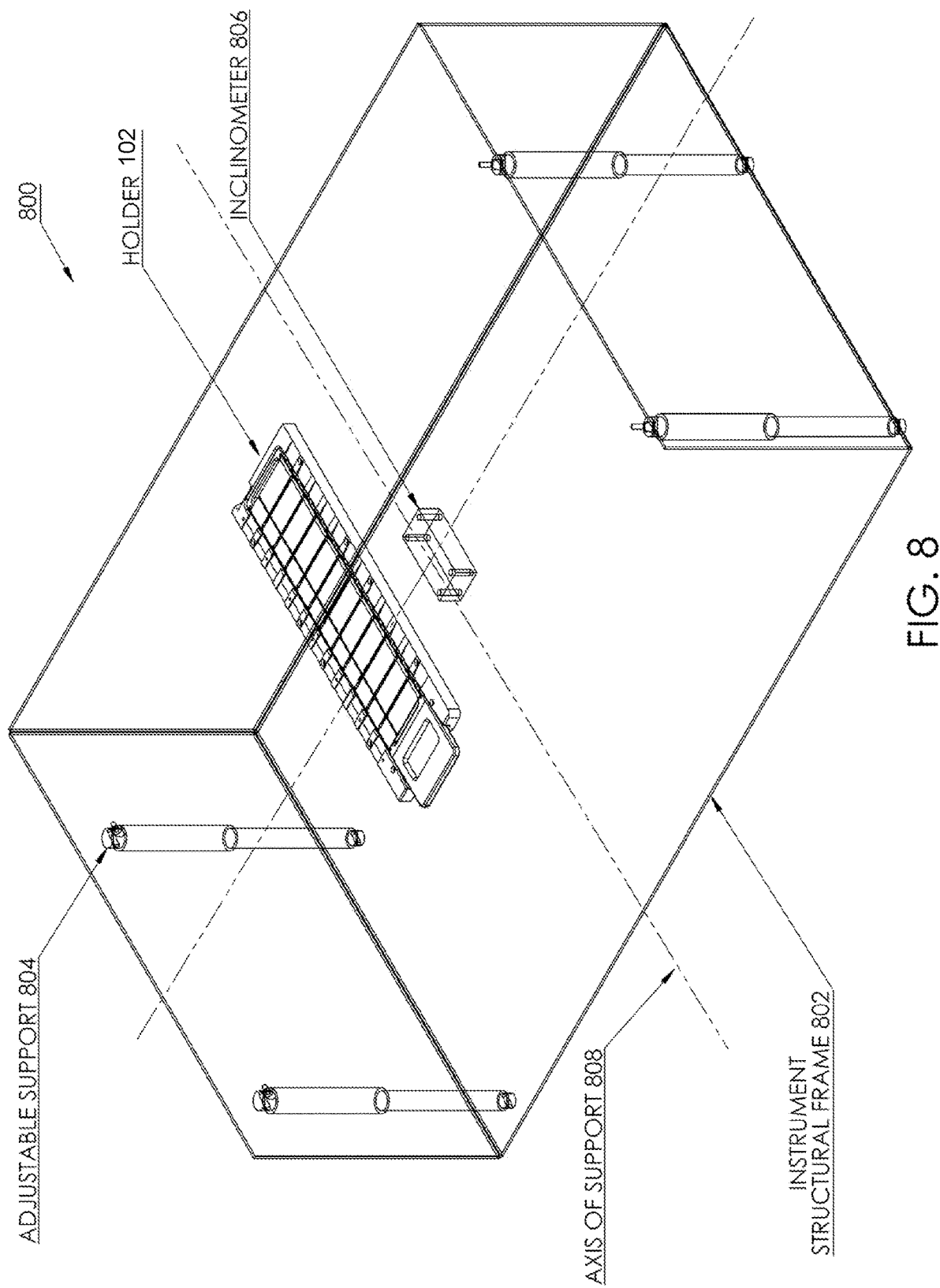
FIG. 8 is a perspective view of an example self-leveling system that may be used with a biological sample processing system.

FIG. 8 shows an implementation of a self-leveling system 800. An instrument structural frame 802 is supported by one or more adjustable supports 804. The adjustable supports 804, may be implemented as adjustable legs, motorized extendable legs, rotating cams, inflatable pneumatic cushions, adjustable length cables supporting instrument structural frame 802 from above, or any other type of support for the instrument structural frame 802. The instrument structural frame 802 may support any of the instruments or devices discussed herein such as the biological sample processing system. Each of the adjustable supports 804 supports at least a portion of the weight of the biological sample processing system or other instruments. One or more adjustable supports 804 may be combined with an inclinometer (e.g., a two-axis high resolution inclinometer) 806, which provides feedback to a control system that drives the adjustable supports 804 up or down as necessary to minimize the inclinometer's angle relative to gravity in both axes of support 808 normal to the gravitational axis. The inclinometer 806 may be mounted such that the two axes it senses are parallel to the plane of a holder 810 for biological samples. In one implementation, the inclinometer 806 may be mounted on the instrument structural frame 802 proximal to the holder 810 so that any flex in the instrument structural frame 802 is minimized. By locating the inclinometer 806 and the holder 802 nearby each other on the same ridged structure, leveling error detected by the inclinometer 806 is indicative of leveling error for the holder 802.

In its most basic form, the self-leveling system 800 is semi-automated and consists of three adjustable supports 804, a dual-axis inclinometer 806, and a user feedback system that indicates which of the supports needs to be extended or retracted in order to level the instrument relative to the gravitational pull of the Earth (or other environment if the instrument is used in an environment with different gravity). The adjustable supports 804 themselves may be adjustable manually. One mechanism for manually adjusting the height of a leg is a foot mounted on the end of an adjustment screw that is turned to extend or retract the foot relative to the instrument structural frame 802 to which the adjustable support 804 is mounted.

If implemented with three adjustable supports 804, the adjustable supports 804 necessarily form a triangle, which must enclose the center of gravity of the instrument under all circumstances (i.e. regardless of the distribution of fluid reagents within the instrument or the location of moving mechanical components such as a liquid aspiration and dispense robot). The inclinometer 806 may be oriented such that one of its sensing axes intersects the position of one of the supports (e.g., a primary leg) and substantially bisects the edge of the triangle formed by the remaining two secondary supports. In this arrangement, the inclinometer 806 will sense changes in level due to adjustment of the primary leg substantially independent of adjustments of the secondary legs. The inclinometer 806 measures the angle of inclination of the instrument structural frame 802 relative to the force of gravity. The inclinometer 806 may measure the inclination along an axis substantially parallel to one of the axes of support 808. This information, combined with knowledge of the distance between the supports and the pitch of their adjustment screws, allows for calculation of the number of turns of each support necessary to level the instrument in all axes of support 808. Leveling of the axis formed by the two secondary supports can be achieved by extending one of them, retracting the other one, or a combination of the two. In practice, one of the three adjustable supports 804 is often much less accessible than the other two (i.e. near the middle of the back of the instrument) and is therefore assigned to be one of the two secondary supports. The least accessible support may be adjusted to the middle of its range prior to installing the instrument and all adjustments to level the instrument after installation are performed using the two more accessible supports.

As mentioned above, the self-leveling system 800 can be implemented with three supports arranged in a triangle as long as the triangle surrounds the instrument's center of gravity. However, this may be challenging to achieve due to the fact that instruments commonly incorporate heavy moving components (e.g. liquid dispense robots), liquid reservoirs within the instrument may be filled to different degrees at different times from sources not supported by the instrument structural frame 802 (e.g., bulk storage tanks placed beside the instrument), and user(s) may place objects of unknown weight at different locations on top of the instrument. Add in constraints on the location of the adjustable supports 804 due to the placement of other components on the instrument structural frame 802 and it may become difficult or impossible to assure that the center of gravity is captured by the triangular support configuration under all conditions. A simple solution is to employ a fourth support and to place the supports near the corners of the instrument structural frame 802. In order to adjust both axes of support 808, at least three supports must be adjustable and the fourth support may be fixed. If the supports are arranged in a rectangle (as opposed to a general quadrilateral polygon), leveling in one axis will be independent of leveling in the orthogonal axis. The use of a fourth motorized support in place of a fixed support allows automated control of both instrument height and leveling.

A feedback system that indicates which adjustable support (s) 804 to adjust may indicate the need for adjustment and in some implementations may also indicate how much to adjust the adjustable support(s) 804. The feedback system can be a dedicated display built into the instrument or it can take the form of a software user interface implemented on a computer system connected to the instrument. Typical inclinometers 806 can be read at a rate of at least once per second, allowing real-time updates to the feedback system as the instrument is in the process of being leveled. The feedback system may be used with manual, semi-automated, or fully automated self-leveling systems 800.

A fully automated leveling system 800 can be implemented by replacing the primary manual adjustment support and at least one of the secondary manual adjustment supports with motorized extendable legs. The motorized extendable legs are controlled by the feedback system through a feedback control loop, in addition to or in place of providing visual, auditory, and/or other feedback to the user, as to the degree to which the system is leveled. If the motorized extendable legs incorporate stepper motors, optical rotary sensors, Hall effect sensors, a potentiometer, or other means of measuring and/or controlling the number of turns of a leg screw, the feedback system can control the motors in a manner analogous to indicating the number of turns of a manual support in order to level the instrument. Alternatively, the feedback system can use the information directly from the inclinometer as the error signal in a negative feedback loop to control the motors and minimize the leveling error in both axes without consideration of the screw pitch of the supports or the distance between them. In some implementations, a microprocessor may be used to calculate the amount of adjustment necessary and communicate this to motors controlling the motorized adjustable supports.

If cost is a consideration, fewer than all of the adjustable supports 804 may be motorized. Fully automated leveling is possible if both the primary support and the least accessible secondary support are motorized extendable supports. This facilitates manual adjustment of the second secondary support in cases where the instrument's supporting surface is highly tilted. Alternatively, for a three-legged instrument, all three legs may be motorized extendable legs to allow not only fully automated leveling but also automated instrument height control.

The instrument structural frame 802 is leveled in order to maintain a biological sample in a level orientation for processing. In the one implementation, a holder 810 for the biological sample is attached to the instrument structural frame 802 in such a way that an orientation of the holder 810 is constant with respect to an orientation of the instrument structural frame 802. In this implementation, leveling of the instrument structural frame 802 may be done based on a level of the holder 810 relative to gravitational pull rather than a level of the instrument structural frame 802 itself. The holder 810 may be implemented as any of the holders described in this disclosure such as a holder for slide rack that may contain one or more microscope slides.

ILLUSTRATIVE EMBODIMENTS

The following clauses described multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document, "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1: A biological sample processing system comprising: a) a holder configured to hold a substrate in a substantially level orientation relative to gravity; b) a reagent dispenser located above the holder and configured to dispense a heated reagent onto the substrate such that a surface of the substrate is covered with a layer of the reagent; c) a receptacle located beneath the holder and configured to collect the reagent flowing off of the substrate; and d) a fluid path connecting the receptacle to the reagent dispenser for recirculating the reagent.

Clause 2: The biological sample processing system of clause 1, wherein the holder is a slide rack and the substrate is a microscope slide.

Clause 3: The biological sample processing system of either clause 1 or 2, wherein the reagent dispenser comprises a manifold having a plurality of orifices with a first orifice located above the substrate and a second orifice located above an additional substrate.

Clause 4: The biological sample processing system of any one of clauses 1-3, wherein the reagent comprises an antigen retrieval (AR) solution.

Clause 5: The biological sample processing system of any one of clauses 1-4, further comprising a heater configured to heat the reagent and located in the fluid path connecting the receptacle to the reagent dispenser.

Clause 6: The biological sample processing system of clause 5, wherein the heater is located remote from the holder and the receptacle.

Clause 7: The biological sample processing system of either clause 5 or 6, further comprising a hybrid power supply configured to provide power to the heater from both a mains circuit and a stored power source.

Clause 8: The biological sample processing system of any one of clauses 1-7, further comprising an oil dispenser located above the holder and configured to dispense light mineral oil onto the substrate such that a surface of the substrate is covered with a layer of the light mineral oil, wherein the receptacle is further configured to collect the light mineral oil flowing off of the substrate such that a layer of light mineral oil covers the reagent in the receptacle.

Clause 9: The biological sample processing system of any one of clauses 1-8, further comprising: a) and adjustable support supporting a portion of a weight of the biological sample processing system; b) a motor configured to adjust the adjustable support; and c) an inclinometer in electronic communication with the motor and configured to maintain the holder in the substantially level orientation relative to gravity by adjusting the adjustable support.

Clause 10: A method of preparing a biological sample comprising: a) heating a reagent; b) causing the reagent to flow from a reservoir to a reagent dispenser; c) placing a substrate supporting a biological sample in a holder; d) dispensing the reagent from the reagent dispenser onto the biological sample such that the biological sample and the substrate are covered with a layer of the reagent; and e) collecting the reagent that flows off the biological sample in a receptacle located beneath the holder.

Clause 11: The method of clause 10, wherein the biological sample comprises a wax-embedded tissue section.

Clause 12: The method of either clause 10 or 11, wherein the reagent comprises antigen retrieval (AR) solution.

Clause 13: The method of any one of clauses 10-12, wherein the reservoir comprises the receptacle and the reagent flows from the receptacle to the reagent dispenser.

Clause 14: The method of any one of clauses 10-13, further comprising dispensing light mineral oil onto the biological sample.

Clause 15: The method of clause 14, further comprising collecting overflow light mineral oil in the receptacle such that the light mineral oil forms a layer on the surface of the reagent in the receptacle.

Clause 16: The method of any one of clauses 10-15, further comprising adjusting a position of the holder so that the substrate is level relative to gravity.

Clause 17: The method of clause 16, wherein the adjusting comprises changing the height of an extendable leg supporting a portion of a weight of a biological sample processing system comprising the reservoir, the reagent dispenser, the holder, and the receptacle in response to a signal from an inclinometer.

Clause 18: A biological sample processing system configured to remove wax from a wax-embedded biological sample comprising: a) a holder configured to hold a substrate in a substantially level orientation relative to gravity; b) a reservoir for light mineral oil; and c) a dispenser for dispensing the light mineral oil from the reservoir onto the substrate in the holder such that a surface of the substrate is covered by the light mineral oil, the dispenser located above the holder and in fluid communication with the reservoir.

Clause 19: The biological sample processing system of clause 18, wherein the biological sample comprises a wax-embedded tissue section.

Clause 20: The biological sample processing system of either clause 18 or 19, wherein the holder comprises a slide rack and the substrate comprises a microscope slide.

Clause 21: The biological sample processing system of any one of clauses 18-20, further comprising a receptacle located beneath the holder and configured to collect the light mineral oil flowing off of the substrate.

Clause 22: The biological sample processing system of any one of clauses 18-21, wherein the dispenser comprises a manifold configured to simultaneously dispense the light mineral oil onto the substrate and at least one additional substrate.

Clause 23: The biological sample processing system of any one of clauses 18-22, further comprising an additional dispenser located above the holder for dispensing a heated reagent onto the substrate such that a surface of the substrate is covered with a layer of the reagent.

Clause 24: The biological sample processing system of clause 23, wherein the reagent comprises antigen retrieval (AR) solution.

Clause 25: The biological sample processing system of either clause 23 or 24, further comprising a receptacle located beneath the holder and configured to collect the reagent flowing off of the substrate.

Clause 26: The biological sample processing system of any one of clauses 23-25, further comprising a heater configured to heat the reagent, the heater located in a fluid path connected to the additional dispenser and powered in part by a power storage device and in part by an external power source.

Clause 27: The biological sample processing system of any one of clauses 18-26, further comprising: a) an adjustable support that supports a weight of the biological sample processing system; and b) an inclinometer configured to maintain the holder in the substantially level orientation by adjusting the adjustable support.

Clause 28: An automated method of preparing a wax-embedded biological sample, the method comprising: a) heating a reagent; b) placing a substrate supporting the wax-embedded biological sample in a holder; c) dispensing light mineral oil onto the wax-embedded biological sample thereby creating a dewaxed biological sample; and d) removing the light mineral oil from the dewaxed biological sample by dispensing the heated reagent onto the dewaxed biological sample.

Clause 29: The automated method of clause 28, wherein the reagent comprises antigen retrieval (AR) solution.

Clause 30: The automated method of either clause 28 or 29, wherein the reagent contains a foaming agent and the dispensing the heated reagent comprises generating a layer of foam on the dewaxed biological sample.

Clause 31: The automated method of any one of clauses 28-30, wherein the wax-embedded biological sample comprises a formalin fixed paraffin embedded (FFPE) tissue section.

Clause 32: The automated method of any one of clauses 28-31, further comprising collecting the light mineral oil and the reagent in a receptacle located beneath the holder, wherein the light mineral oil forms a layer on the surface of the reagent.

Clause 33: The automated method of clause 32, further comprising causing the reagent to flow through a fluid path from the receptacle to a dispenser configured to dispense the reagent onto the biological sample thereby recirculating the reagent.

Clause 34: The automated method of any one of clauses 28-33, further comprising adjusting a position of the holder so that the substrate is level relative to gravity.

Clause 35: The automated method of clause 34, wherein the adjusting comprises activating a motor to move at least one adjustable support of a biological sample processing system containing the holder.

Clause 36: A biological sample processing system comprising: a) a flow-through heater configured to heat a liquid reagent; b) a connection to an external power source; c) a power storage device; and d) a switch configured to direct electricity from the power storage device to the biological sample processing system in addition to electricity from the external power source in response to the biological sample processing system drawing a load greater than a threshold load.

Clause 37: The biological sample processing system of clause 36, wherein the threshold load is a load supported solely by the external power source.

Clause 38: The biological sample processing system of either clause 36 or 37, wherein the switch is configured to direct power from the external power source to the power storage device in response to the biological sample processing system drawing less than the threshold load.

Clause 39: The biological sample processing system of any one of clauses 36-38, wherein the power storage device is a rechargeable battery.

Clause 40: The biological sample processing system of any one of clauses 36-39, wherein the switch is a hybrid inverter/charger capable of supplying power to the biological sample processing system, the power drawn from one or both of the external power source and the power storage device.

Clause 41: The biological sample processing system of any one of clauses 36-40, wherein the heater, when activated draws a load greater than the threshold load, and the biological sample processing system when the heater is not activated draws a load less than about 50% of the threshold load.

Clause 42: The biological sample processing system of any one of clauses 36-41, further comprising: a) an adjustable support that supports a weight of the biological sample processing system; and b) an inclinometer configured to maintain an inclination of the biological sample processing system relative to gravitational pull based on a signal provided by the inclinometer.

Clause 43: A biological sample processing system comprising: a) an instrument structural frame; b) a holder directly or indirectly fixed in position relative to the instrument structural frame and configured to hold a substrate in a substantially level orientation; c) an inclinometer connected to the instrument structural frame such than an orientation of the inclinometer relative to gravitational pull is the same as an orientation of the holder relative to gravitational pull and configured to measure an inclination relative to gravitational pull; and d) an adjustable support connected proximate to a corner of the instrument structural frame and configured to adjust the inclination of the biological sample processing system with respect to an axis of support in response to a signal provided by the inclinometer.

Clause 44: The biological sample processing system of clause 43, wherein the holder is a slide rack and the substrate is a microscope slide.

Clause 45: The biological sample processing system of either clause 43 or 44, wherein the inclinometer measures the inclination of the biological sample processing system along an axis substantially parallel to the axis of support.

Clause 46: The biological sample processing system of any one of clauses 43-45, further comprising control circuitry communicatively coupled to the adjustable support and to the inclinometer, the control circuitry forming a feedback control loop that adjusts the adjustable support in response to signals from the inclinometer.

Clause 47: The biological sample processing system of any one of clauses 43-46, wherein the adjustable support comprises a motorized leg supporting at least a portion of a weight of the biological sample processing system.

Clause 48: The biological sample processing system of any one of clauses 43-47, further comprising at least two additional adjustable supports coupled to the instrument structural frame, a center of gravity of the biological sample processing system surrounded by the adjustable support and the at least two additional adjustable supports.

Clause 49: The biological sample processing system of any one of clauses 43-48, further comprising: a) a component that draws electrical power; b) a connection to an external power source in electrical connection with the component that draws electrical power; c) a power storage device in electrical connection with the external power source; and d) a switch in electrical connection with the external power source, the power storage device, and the component, the switch configured to direct electricity from the power storage device to the component in addition to electricity from the external power source in response to the component drawing more than a threshold load.

CONCLUSION

The terms "a," "an," "the" and similar referents used in the context of describing the invention (especially in the context of the following claims) are to be construed to cover both the singular and the plural, unless otherwise indicated herein or clearly contradicted by context. The term "based on" is to be construed to cover both exclusive and nonexclusive relationships. For example, "A is based on B" means that A is based at least in part on B and may be based wholly on B. By "about" or the tilde symbol "~" is meant a quantity, level, value, number, frequency, percentage, dimension, size, amount, temperature, weight or length that varies by as much as 10, 9, 8, 7, 6, 5, 4, 3, 2, or 1% to a reference quantity, level, value, number, frequency, percentage, dimension, size, amount, temperature, weight or length.

All methods described herein can be performed in any suitable order unless otherwise indicated herein or otherwise clearly contradicted by context. The use of all examples and exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified, thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A method of preparing a biological sample comprising:
   a) causing an aqueous reagent to flow from a reservoir to a reagent dispenser;
   b) heating the aqueous reagent to about its boiling point while the aqueous reagent flows to the reagent dispenser;
   c) placing a substrate supporting a biological sample in a holder;
   d) determining whether the substrate in the holder is level relative to gravity and upon determining that the substrate is not level relative gravity, adjusting a position of the holder so that the substrate is level relative to gravity, wherein the adjusting comprises changing the height of an extendable leg supporting a portion of a weight of a biological sample processing system comprising the reservoir, the reagent dispenser, the holder, and a receptacle located beneath the holder;
   e) dispensing the aqueous reagent that flowed into the reagent dispenser onto the biological sample in the holder such that the biological sample and the substrate are covered with a layer of the aqueous reagent; and
   f) collecting the aqueous reagent that flows off the biological sample in the receptacle.

2. The method of claim 1, wherein the biological sample comprises a wax-embedded tissue section.

3. The method of claim 1, wherein the aqueous reagent comprises antigen retrieval (AR) solution.

4. The method of claim 1, wherein the reservoir comprises the receptacle and the aqueous reagent flows from the receptacle to the reagent dispenser.

5. The method of claim 1, further comprising dispensing light mineral oil onto the biological sample prior to dispensing the aqueous reagent.

6. The method of claim 5, further comprising collecting overflow light mineral oil in the receptacle such that the light mineral oil forms a layer on the surface of the aqueous reagent in the receptacle.

7. The method of claim 1, wherein the adjusting is performed in response to a signal from an inclinometer.

8. The method of claim 1, wherein heating the aqueous reagent to about its boiling point comprises using a flow-through heater.

9. A method of preparing a biological sample comprising:
   a) dispensing light mineral oil onto the biological sample;
   b) causing an aqueous reagent to flow from a reservoir to a reagent dispenser;
   c) heating the aqueous reagent to about its boiling point while the aqueous reagent flows to the reagent dispenser;
   d) placing a substrate supporting a biological sample in a holder;
   e) dispensing the aqueous reagent that flowed into the reagent dispenser onto the biological sample in the holder such that the biological sample and the substrate are covered with a layer of the aqueous reagent;
   f) collecting overflow light mineral oil in a receptacle beneath the holder; and
   g) collecting the aqueous reagent that flows off the biological sample in the receptacle such that the light mineral oil forms a layer on the surface of the aqueous reagent in the receptacle.

10. The method of claim 9, wherein the biological sample comprises a wax-embedded tissue section.

11. The method of claim 9, wherein the aqueous reagent comprises antigen retrieval (AR) solution.

12. The method of claim 9, wherein the reservoir comprises the receptacle and the aqueous reagent flows from the receptacle to the reagent dispenser.

13. The method of claim 9, further comprising adjusting a position of the holder so that the substrate is level relative to gravity.

14. The method of claim 12, wherein the adjusting comprises changing the height of an extendable leg supporting a portion of a weight of a biological sample processing system comprising the reservoir, the reagent dispenser, the holder, and the receptacle in response to a signal from an inclinometer.

15. The method of claim 9, wherein heating the aqueous reagent to about its boiling point comprises using a flow-through heater.

* * * * *